US012487193B2

(12) United States Patent
Zhou et al.

(10) Patent No.: US 12,487,193 B2
(45) Date of Patent: Dec. 2, 2025

(54) SYSTEMS, DEVICES, AND METHODS FOR MULTISOURCE VOLUMETRIC SPECTRAL COMPUTED TOMOGRAPHY

(71) Applicant: The University of North Carolina at Chapel Hill, Chapel Hill, NC (US)

(72) Inventors: Otto Z. Zhou, Chapel Hill, NC (US); Jianping Lu, Chapel Hill, NC (US); Christina Inscoe, Holly Springs, NC (US); Yueh Zenas Lee, Chapel Hill, NC (US); Boyuan Li, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 335 days.

(21) Appl. No.: 18/030,948

(22) PCT Filed: Oct. 8, 2021

(86) PCT No.: PCT/US2021/054122
§ 371 (c)(1),
(2) Date: Apr. 7, 2023

(87) PCT Pub. No.: WO2022/076787
PCT Pub. Date: Apr. 14, 2022

(65) Prior Publication Data
US 2023/0375484 A1    Nov. 23, 2023

Related U.S. Application Data

(60) Provisional application No. 63/089,875, filed on Oct. 9, 2020.

(51) Int. Cl.
*A61B 6/03* (2006.01)
*G01N 23/046* (2018.01)
(Continued)

(52) U.S. Cl.
CPC .......... *G01N 23/046* (2013.01); *G06T 11/005* (2013.01); *H01J 35/045* (2013.01);
(Continued)

(58) Field of Classification Search
CPC .. A61B 6/51; A61B 6/032; A61B 6/06; A61B 6/4007; A61B 6/4035; A61B 6/482;
(Continued)

(56) References Cited

U.S. PATENT DOCUMENTS 5,265,142 A    11/1993   Hsieh
7,844,032 B2 *  11/2010  Vermilyea ............... H01J 35/16
                                                         378/9
(Continued)

FOREIGN PATENT DOCUMENTS

EP     2472290 A2     7/2012
WO     2020117734 A1  6/2020

OTHER PUBLICATIONS

International Search Report and Written Opinion for Application No. PCT/US2021/054122 dated Mar. 2, 2022.
(Continued)

*Primary Examiner* — Jurie Yun
(74) *Attorney, Agent, or Firm* — KDW FIRM PLLC

(57) ABSTRACT

A multisource volumetric spectral computed tomography imaging device includes an x-ray source array with multiple spatially distributed x-ray focal spots, an x-ray beam collimator with an array of apertures, each confining the radiation from a corresponding x-ray focal spot to illuminate a corresponding segment of an object, a digital area x-ray detector, and a gantry to rotate the x-ray source array and the detector around the object. An electronic control unit activates the radiations from the x-ray focal spots to scan the object multiple times as the gantry rotates around the object. The images are used to reconstruct a volumetric CT image
(Continued)

of the object with reduced scattered radiation. For dual energy and multi energy imaging, radiation from each focal spot is filtered by a corresponding spectral filter to optimize its energy spectrum.

29 Claims, 25 Drawing Sheets

(51) Int. Cl.
*G06T 11/00* (2006.01)
*H01J 35/04* (2006.01)
*H01J 35/06* (2006.01)
*H01J 35/14* (2006.01)

(52) U.S. Cl.
CPC .......... *H01J 35/065* (2013.01); *H01J 35/147* (2019.05); *H01J 35/153* (2019.05); *G01N 2223/055* (2013.01); *G01N 2223/206* (2013.01); *G01N 2223/313* (2013.01); *G01N 2223/3301* (2013.01); *G01N 2223/401* (2013.01); *G01N 2223/419* (2013.01); *G01N 2223/421* (2013.01); *G01N 2223/424* (2013.01); *G01N 2223/6123* (2013.01); *G01N 2223/6126* (2013.01); *G06T 2211/408* (2013.01); *H01J 2201/30469* (2013.01)

(58) Field of Classification Search
CPC ..... A61B 6/4085; A61B 6/501; A61B 6/5258; A61B 6/583; G01N 23/046; G01N 2223/055; G01N 2223/206; G01N 2223/313; G01N 2223/3301; G01N 2223/401; G01N 2223/419; G01N 2223/421; G01N 2223/424; G01N 2223/6123; G01N 2223/6126; G06T 11/00; G06T 11/005; G06T 2211/408; H01J 35/04; H01J 35/06; H01J 35/14; H01J 35/045; H01J 35/065; H01J 35/147; H01J 35/153; H01J 2201/30469

See application file for complete search history.

(56) References Cited

U.S. PATENT DOCUMENTS

2015/0223767 A1   8/2015   Sehnert et al.
2016/0256128 A1   9/2016   Wang et al.

OTHER PUBLICATIONS

Angelopoulos et al., "A Comparison of Maxillofacial CBCT and Medical CT," Atlas Oral Maxillofacial Surgery Clinics North America, vol. 20: 1-17 (2012)—Abstract.

Hokamp et al., "Artifact reduction from dental implants using virtual monoenergetic reconstructions from novel spectral detector CT," European Journal of Radiology, vol. 104: 136-142 (Jul. 2018)—Abstract.

Siewerdsen et al., "Cone-beam computed tomography with a flat-panel imager: Magnitude and effects of x-ray scatter," Medical Physics, vol. 28, Issue 2: 220-231 (Feb. 2001).

* cited by examiner

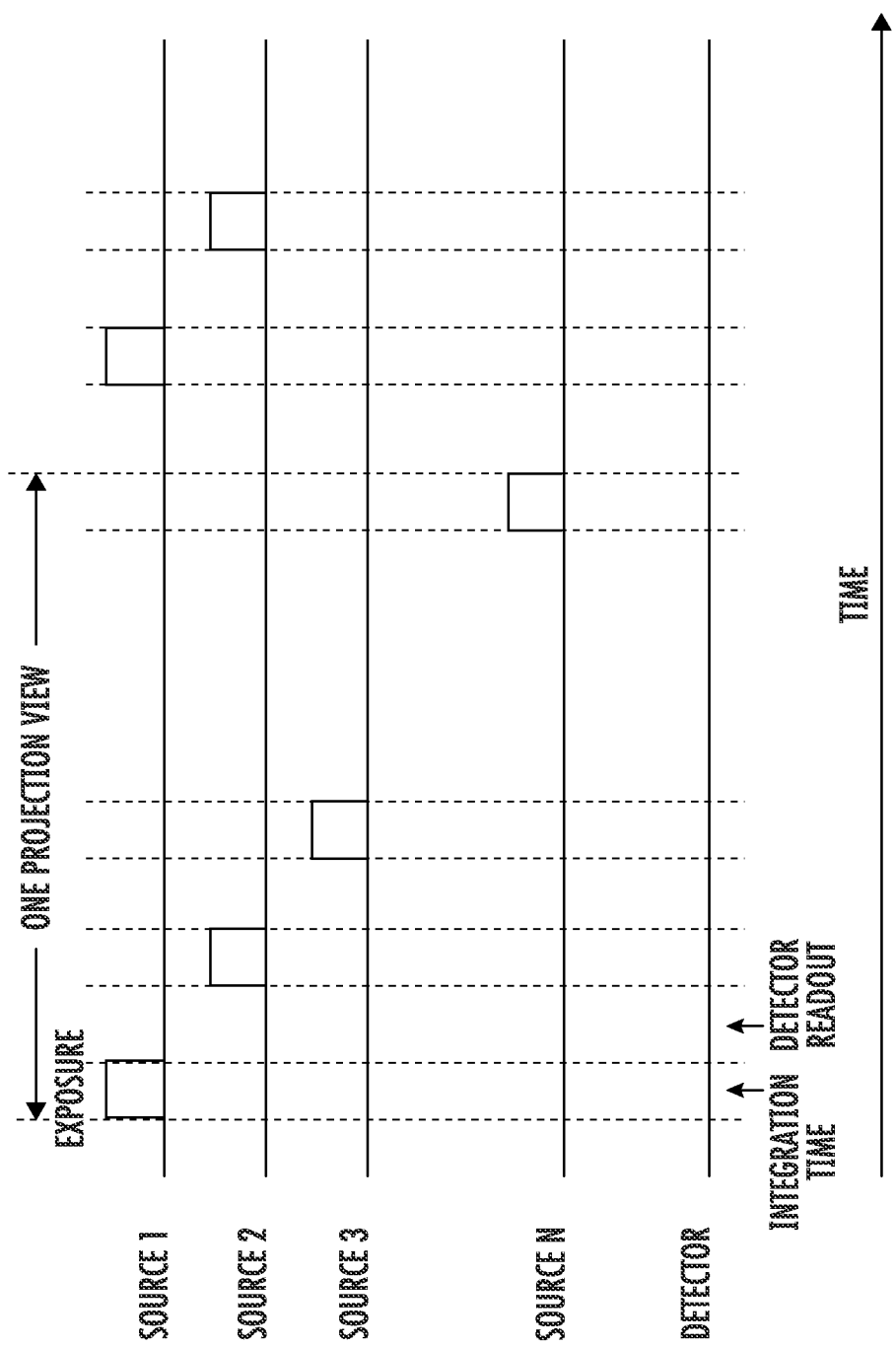

TABLE 1: ESTIMATED IMAGING PARAMETERS FOR THE PROPOSED mSCT IN SINGLE AND DUEL ENERGY MODES

| | TUBE (mA) | TUBE (KV) | TOTAL mAs | SCAN TIME (SEC) | # OF PROJ | mAs PER EXPO. | # OF SOURCE | TIME/ SOURCE (msec) | X-RAY EXP. (msec) | DET. READOUT (msec) |
|---|---|---|---|---|---|---|---|---|---|---|
| SINGLE ENERGY | 15 | 0-120 | 20 | 20 | 300 | 0.066 | 6 | 11.1 | 4.4 | 6.7 |
|  |  |  | 20 | 20 | 200 | 0.1 | 10 | 10 | 6.6 | 3.4 |
| DUAL ENERGY |  |  | 30LE | 20 | 300 | 0.1LE / 0.1HE | 3HE / 3LE | 11.1 | 6.7 | 4.4 |
|  |  |  | 30HE | 30 | 200 | 0.2LE / 0.2HE | 5HE / 5LE | 15 | 10 | 5 |
| CS CBCT | 2-15 | 60-90 | 20-150 | 20 |  | 0.066-0.5 | 1 |  |  |  |

FIG. 7

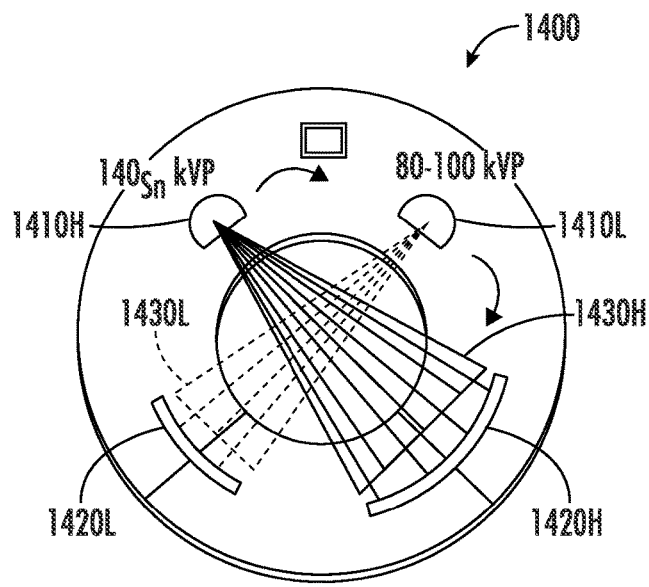
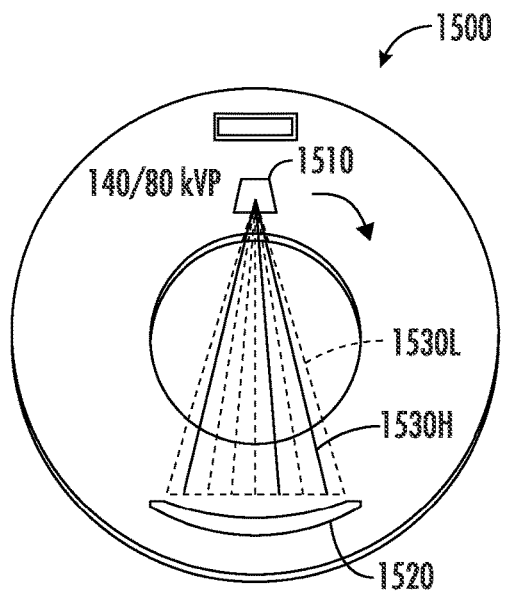
FIG. 13A
FIG. 13B
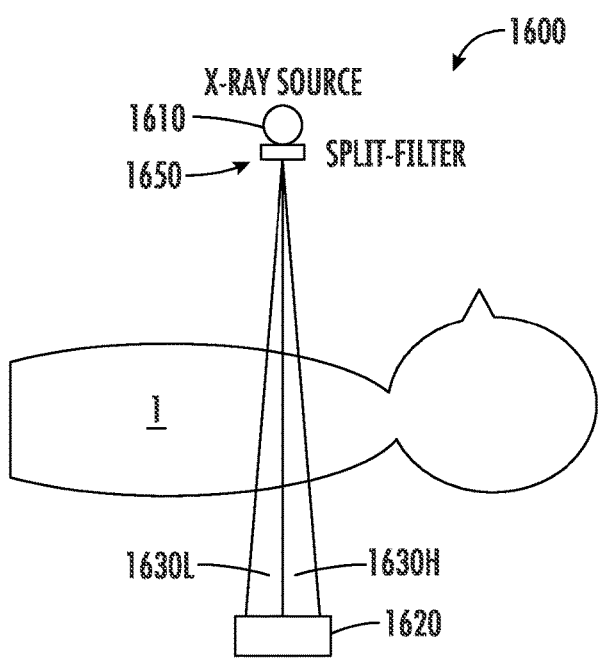
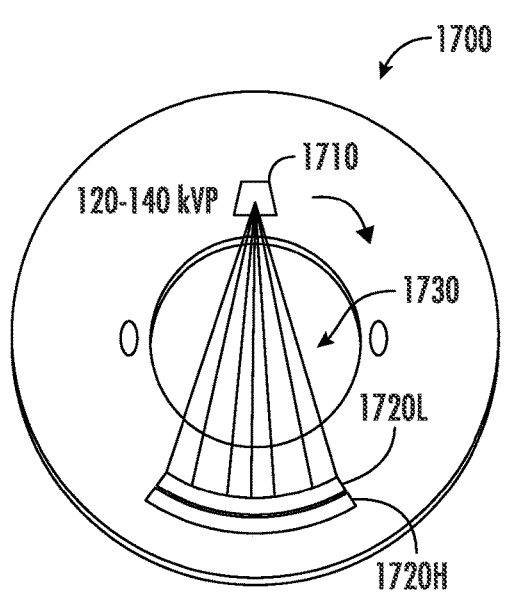
FIG. 13C
FIG. 13D

SYSTEMS, DEVICES, AND METHODS FOR MULTISOURCE VOLUMETRIC SPECTRAL COMPUTED TOMOGRAPHY

CROSS-REFERENCE TO RELATED APPLICATIONS

This application claims the benefit or and priority to U.S. Provisional Patent Application Ser. No. 63/089,875, which was filed on Oct. 9, 2020, the disclosure of which is incorporated by reference herein in its entirety.

TECHNICAL FIELD

The subject matter disclosed herein relates generally to computed tomography (CT) imaging. More particularly, the subject matter disclosed herein relates to multisource volumetric spectral CT imaging.

BACKGROUND

Since its introduction about fifty years ago, computed tomography (CT) has experienced tremendous improvement in the imaging technology and growth in its clinical applications. In recent years cone-beam CT (CBCT), as a volumetric 3D imaging modality, has found growing applications in areas including on-board image guidance for radiation therapy (IGRT), intraoperative imaging for surgical guidance, maxillofacial radiology, and extremity imaging.

In CBCT the radiation from an x-ray source is collimated to a conical geometry to cover a large region-of interest (ROI). Using a large-area flat-panel detector (FPD) an entire volumetric dataset is acquired with a single rotation of the x-ray source-detector pair in an open gantry, eliminating the need for patient translation in regular fan-beam CT. Additional advantages of CBCT compared to fan-beam CT include a smaller footprint, mobility, and lower radiation dose. This makes CBCT particularly attractive for image-guided therapies. On-board CBCT is being used in modern radiation therapy for patient setup, dose verification, and adaptive re-planning. C-arm based CBCT brought 3D imaging capability to the operating suite, resulting in a major advancement in intraoperative imaging.

CBCT provides a three-dimensional (3D) representation of the maxillofacial region of the skull and dentition with minimal distortion and improved image sharpness at relatively low cost and low radiation dose. It has found wide applications in dentistry since it was approved by the FDA 20 years ago. Examples of clinical tasks performed by CBCT include dental implant and orthodontic treatment planning, and evaluation of endodontic and pathological conditions.

CBCT has several known limitations including: (1) high scatter radiation, (2) strong metal-induced imaging artifacts, and (3) various cone-beam image artifacts that degrade the image quality and compromise its diagnostic accuracy.

The presence of strong metal-induced imaging artifacts in and/or on anatomical structures to be imaged, however, has represented a significant limitation in the use of CBCT. The strong x-ray attenuation caused by the presence of common metal structures, especially in dentistry application, where it is common to encounter metallic dental restorations and implants, results in beam hardening and photon starvation in all known CBCT-based imaging techniques and systems. This phenomenon leads to imaging artifacts in the form of, for example, streaks and halos, in the reconstructed 3D images produced using CBCT. Such metal-induced imaging artifacts degrade image quality, compromise diagnostic accuracy, and make dental CBCT wholly ineffective, for example, in postoperative evaluation of the osseointegration of implants. Various postprocessing techniques are known to have been investigated for metal artifact reduction (MAR), however, the results of these algorithms have proven to be generally unworkable for their intended purposes.

The divergent cone beam also introduces aliasing artifacts and truncation errors. Because of the high scattered radiation and image artifacts CBCT is known to underestimate the CT Hounsfield Unit (HU).

Virtual monoenergetic images (VMI) synthesized using dual-energy CT (DECT) datasets at high virtual monoenergetic energies are known to reduce metal artifacts, particularly for small metallic objects such as dental implants.

With images obtained at two different polychromatic energy spectra, DECT enables more quantitative analysis including determination of the photoelectric and Compton contributions to the attenuation coefficient, synthesizing virtual monoenergetic images (VMI), calculation of the effective atomic number and effective electron density, and more accurate determination of the CT Hounsfield Unit, without increasing the x-ray exposure levels for patients. Dual energy imaging is also used in other x-ray imaging modalities, including contrast enhanced dual energy tomosynthesis.

Several technologies have been developed for DECT imaging, examples of which are shown in FIGS. 13A-D. In FIG. 13A, a dual source CT (DSCT) system uses two x-ray tubes operating at different tube voltages (kVp) and two energy integrating detectors (EIDs). In the system of FIG. 13B, rapid kVp switching of a single x-ray tube between low energy (LE) and high energy (HE) is used to produce two polychromatic spectra. In the system of FIG. 13C, a split-filter CT is used, which has a single x-ray source and two adjacent filters. The system of FIG. 13D is a CT imaging system with an energy sensitivity detector.

However, each of these dual energy imaging systems suffers from a major shortcoming associated with the significantly increased cost of the equipment needed to build and operate such DECT systems. In addition, each of the example known DECT systems shown in FIGS. 13A-D have various technical limitations associated therewith. In DSCT, the LE and HE spectra can be generated simultaneously, with independent control of the tube current and kVp to balance the radiation dose and for anatomical dose modulation, and can be further optimized by introducing individual filters. However, in such known DECT systems using two x-ray tubes and detectors, as well as other necessary additional electronics devices, such systems are known to be significantly more expensive in comparison to a single energy CT system.

Rapid kVp switching, on the order of ~60 kV is also known to require the installation and usage of expensive electronics to modulate power levels to such a degree. The kVp profile resultant from such rapid switching also deviates substantially from the ideal step function for CT imaging, which results in the introduction of uncertainty and/or error in quantitative analysis. By using common filtration, the LE and HE spectra have substantially more overlap compared to DSCT, which causes a degradation of accuracy for materials decomposition.

Using currently known technology, there exists a difficulty in rapidly changing the tube current simultaneously with changes to the kVp, which leads to a much lower photon flux and a higher imaging noise in the LE spectra, as compared to the HE spectra. In addition, anatomical dose modulation for patient radiation dose reduction is challenging. In split-filter DECT, each beam covers only half of the detector width in the axial direction and has a smaller energy separation than using DSCT. Thus, it is necessary to significantly increase the X-ray output to compensate for the additional attenuation from the use of such spectral filters. Increased spectral overlap between LE and HE spectra also reduces efficiency and precision for tissue differentiation. Although there have been significant advances in the development of energy-sensitive detectors, such as photon counting detectors, costs associated with such detectors are significantly higher than conventionally used energy integrating detectors and such detectors are also known to suffer from photon pile up and cross talk.

Most of the known DECT systems are based on fan-beam geometry and DECT systems are not commonly available in dental clinics due to the high cost associated therewith. A dual energy CBCT (DE-CBCT) was recently introduced for dental imaging which requires both fast kVp switching and spectral filtration. Along with the increased cost, high scattered radiation was still present due to the large cone angle.

In order to address the disadvantages known from the prior art imaging techniques, a new cone beam CT imaging system and method are disclosed herein.

SUMMARY

In accordance with this disclosure, a volumetric spectral computed tomography (CT) imaging device is provided, the device comprising: an x-ray source array comprising M numbers of spatially distributed x-ray focal spots; an x-ray beam collimator attached to the x-ray source array, wherein the x-ray beam collimator contains an array of apertures, each configured to confine the x-ray radiation from a corresponding x-ray focal spot to illuminate a corresponding segment of an object to be imaged; a digital area x-ray detector configured to detect x-ray radiation and form an x-ray image of the object being imaged, wherein the digital area x-ray detector is positioned on an opposite side of the object with respect to the x-ray source array; a gantry configured to rotate the x-ray source array and the digital area x-ray detector around the object, wherein the spatially distributed x-ray focal spots are substantially aligned either along a direction of a rotation axis of the gantry or along a direction of rotation of the gantry; an electronic control unit that activates the M numbers of x-ray focal spots to scan the object N times as the gantry rotates around the object; and one or more processing systems configured to process the raw N×M projection images to reconstruct a volumetric CT image of the object.

In some embodiments, radiation from each focal spot is configured to be filtered by a corresponding spectral filter.

In some embodiments, only a subset of the focal spots is used to acquire projection images for CT image reconstruction.

In some embodiments, wherein the x-ray focal spots are divided into a first set and a second set; wherein x-ray beams from the focal spots in the first set are filtered by a first filter material(s) configured to yield a spectrum with a first mean x-ray photon energy, and x-ray beams in the second set are filtered by a second filter material(s) configured to yield a spectrum with a second mean x-ray photon energy, the first mean x-ray photon energy being different from the second mean x-ray photon energy; and wherein two sets of projection images acquired from the first set and the second set is sufficient to reconstruct the volumetric CT image of the whole object at each distinct x-ray spectrum.

In some embodiments, the first mean x-ray photon energy is lower than the second mean x-ray photon energy; and the two sets of projection images captured using the first mean x-ray photon energy and the second mean x-ray photon energy are processed to obtain the dual energy CT images of the object.

In some embodiments, the two sets of projection images are processed to obtain virtual monochromatic energy CT images of the object at any desired virtual monochromatic energy.

In some embodiments, the x-ray focal spots are divided into multiple sets wherein x-ray beams from the x-ray focal spots in each set are filtered by a unique spectral filter to yield a unique x-ray energy spectrum; the x-ray beams from each set illuminate substantially an entire field of view (FOV) to generate one complete set of projection images for CT reconstruction in one gantry rotation; and multiple sets of projection images at multiple energies are used for multi-energy CT image reconstruction.

In some embodiments, x-ray beams from the multiple focal spots are configured to be activated sequentially; wherein, for each x-ray exposure, a projection image of a corresponding segment of the object is formed on a corresponding segment of the digital area x-ray detector; and wherein the digital area x-ray detector is configured to reject any x-ray photons that are recorded outside the corresponding segment of the digital area x-ray detector as scatter radiation.

In some embodiments, the x-ray source array with multiple x-ray focal spots is housed in one common and evacuated housing with either one elongated anode or multiple anodes.

In some embodiments, the x-ray source array is a carbon nanotube-based field emission x-ray source array.

In some embodiments, an x-ray beam from each focal spot is configured to cover the object entirely; and wherein the N×M projection images of the object is configured to be used for tomographic or tomosynthesis image reconstruction of the object equivalent to that from a 2D area array of the focal spots.

In some embodiments, the digital area x-ray detector uses a dynamic band reading method, or region-of-interest (ROI) readout, to increase a data readout speed of the digital area x-ray detector; wherein after exposure from each collimated x-ray beam, only a "band," or ROI, of the x-ray detector that receives primary transmitted x-ray photons is read by the digital area x-ray detector instead of the entire detector which the amount of the data read and transmitted.

In some embodiments of the imaging device, the digital area x-ray detector uses a dynamic region-of-interest (ROI) readout method, to increase a data readout speed of the digital area x-ray detector; and, after exposure from each collimated x-ray beam, only a "band," or ROI, of the digital area x-ray detector that receives primary transmitted x-ray photons is read by the digital area x-ray detector instead of the entire detector.

In some embodiments, a precise location of each detector band associated with each x-ray source (focal spot) is pre-determined from the configuration of the imaging system, wherein the software automatically determines a region of the digital area x-ray detector to be read for each specific x-ray exposure.

In some embodiments, the N×M projection images are treated as one complete data set for volumetric CT reconstruction using a model-based iterative reconstruction method, wherein locations of the x-ray focal spots for the N×M projection images are predetermined during system calibration.

In some embodiments, the reconstructed CT images are stored in a Digital Imaging and Communications in Medicine (DICOM) format and can be viewed, analyzed and stored using third party software packages.

In another aspect, a volumetric spectral computed tomography imaging device with increased contrast resolution and reduced metal-induced imaging artifacts is provided, the device comprising: an x-ray source array comprising M numbers of spatially distributed x-ray focal spots enclosed in a same evacuated housing, wherein the spatially distributed focal spots are divided into two groups, wherein x-ray radiation from each group is filtered by a corresponding spectral filter material to produce a distinct energy spectrum; an x-ray beam confining device attached to the x-ray source array, wherein the x-ray beam confining device comprises: an array of apertures, each configured to confine x-ray radiation from a corresponding x-ray focal spot to form a fan beam shape with a narrow cone angle that illuminates a corresponding segment of an object, wherein radiation from each group of focal spots collectively cover an entire field-of-view (FOV); a digital area x-ray detector; a gantry configured to rotate the x-ray source array and the digital area x-ray detector around the object; an electronic control unit configured to activate the M numbers of x-ray focal spots, one or more beams at a time, to scan across the object N times as the gantry rotates around the object, and configured to read out an image recorded on a corresponding area of the digital area x-ray detector and configured to reject scattered x-ray photons received outside an area of the digital area x-ray detector for each x-ray exposure; and one or more processing systems configured to process the projection images formed by radiation exposure from each group of focal spots to reconstruct two volumetric CT image datasets of the object, each volumetric CT image dataset taken at a different mean x-ray photon energy, the one or more processing systems being further configured to synthesize virtual monoenergetic CT image datasets at desired energy levels with reduced metal-induced imaging artifacts; wherein the spatially distributed x-ray focal spots are substantially aligned along a direction of the gantry rotation axis.

In another aspect, a method for performing volumetric spectral computed tomography (CT) imaging of an object is provided, the method comprising: providing a volumetric spectral computed tomography imaging device comprising: an x-ray source array comprising M numbers of spatially distributed x-ray focal spots; an x-ray beam confiner attached to the x-ray source array, wherein the x-ray beam confiner contains an array of apertures, each configured to confine the x-ray radiation from a corresponding x-ray focal spot to a fan beam having a narrow cone angle that illuminates a corresponding segment of the object to be imaged; a digital area x-ray detector configured to detect x-ray radiation and form an x-ray image of the object being imaged, wherein the digital area x-ray detector is positioned on an opposite side of the object with respect to the x-ray source array; and a gantry configured to rotate the x-ray source array and the digital area x-ray detector around the object, wherein the spatially distributed x-ray focal spots are substantially aligned along a direction of a rotation axis of the gantry; activating the M numbers of x-ray focal spots to scan the object N times; rotating the gantry around the object while the x-ray focal spots are activated; filtering radiation from each focal spot by a corresponding spectral filter; and processing, using one or more processors, N×M projection images to reconstruct a volumetric CT image of the object.

In some embodiments, the method father comprises using only a subset of the focal spots to acquire projection images for CT image reconstruction.

In some embodiments, the x-ray focal spots are divided into a first set and a second set; wherein x-ray beams from the focal spots in the first set are filtered by a first filter material configured to yield a spectrum with a first mean x-ray photon energy, and x-ray beams in the second set are filtered by a second filter material configured to yield a spectrum with a second mean x-ray photon energy, the first mean x-ray photon energy being different from the second mean x-ray photon energy; and wherein two sets of projection images acquired from the first set and the second set is sufficient to reconstruct the volumetric CT image of the whole object at each distinct x-ray spectrum.

In some embodiments, processing the N×M images comprises processing images captured using the first mean x-ray photon energy and images captured using the second mean x-ray photon energy to obtain a single volumetric CT image of the object.

In some embodiments, the first mean x-ray photon energy is lower than the second mean x-ray photon energy; and wherein the two sets of projection images captured using the first mean x-ray photon energy and the second mean x-ray photon energy are processed to obtain the dual energy CT images of the object.

In some embodiments, the two sets of projection images are processed to obtain one or more virtual monochromatic energy CT images of the object at any desired energy.

In some embodiments, the x-ray focal spots are divided into multiple sets wherein x-ray beams from the x-ray focal spots in each set are filtered by a unique spectral filter to yield a unique x-ray energy spectrum; and wherein the x-ray beams from each set illuminate substantially an entire field of view (FOV) to generate one complete set of projection images for CT reconstruction in one gantry rotation.

In some embodiments, the method further comprises sequentially activating x-ray beams from the multiple focal spots; wherein, for each x-ray exposure, a projection image of a corresponding segment of the object is formed on a corresponding segment of the digital area x-ray detector; and wherein the digital area x-ray detector is configured to reject any x-ray photons that are recorded outside the corresponding segment of the digital area x-ray detector as scatter radiation.

In some embodiments, the x-ray source array with multiple x-ray focal spots is housed in one common and evacuated housing with either one elongated anode or multiple anodes.

In some embodiments, the x-ray source array is a carbon nanotube-based field emission x-ray source array.

In some embodiments, an x-ray beam from each focal spot is configured to cover the object entirely; and the N×M projection images of the object is configured to be used for tomographic or tomosynthesis image reconstruction of the object equivalent to that from a 2D area array of the focal spots.

In another aspect, a dual-energy computed tomography (CT) imaging device is provided, the imaging device comprising: an x-ray generator comprising an x-ray source, which has at least one cathode and at least one anode and is configured to emit x-ray radiation from first and second focal spots for imaging an object, and first and second spectral filters, wherein the first spectral filter is configured to filter the x-ray radiation from the first focal spot to produce low-energy (LE) x-ray radiation with a low mean energy, and wherein the second spectral filter is configured to filter the x-ray radiation from the second focal spot to produce high-energy (HE) x-ray radiation, the HE x-ray radiation having a higher mean energy than the LE x-ray radiation; an x-ray beam collimator that is configured to confine the LE x-ray radiation and the HE x-ray radiation to substantially a same region of interest on, in, and/or about the object; an x-ray detector configured to detect x-ray radiation and form an x-ray image of the object, wherein the x-ray detector is positioned on a different side of the object relative to the x-ray source; a gantry configured to rotate the x-ray source and the x-ray detector around the object; a controller that is configured to (1) activate the LE x-ray radiation and the HE x-ray radiation multiple times in an alternating exposure pattern as the x-ray source and the x-ray detector are rotated about the object, such that an LE projection image of the object is recorded by the x-ray detector for each exposure of the LE x-ray radiation and an HE projection image of the object is recorded by the x-ray detector for each exposure of the HE x-ray radiation; and (2) activate and program an exposure level of the LE x-ray radiation and an exposure level of the HE x-ray radiation, wherein the exposure level of the LE x-ray radiation is independent of the exposure level of the HE x-ray radiation; and one or more processing systems configured to reconstruct dual-energy CT images of the object using the LE projection images and the HE projection images.

In some embodiments, the at least one cathode of the x-ray source comprises at least first and second cathodes, each of which is configured to emit electrons in a form of an electron beam, wherein the at least one anode is only one anode, wherein the first and second focal spots are on the anode, wherein first cathode is positioned such that the electron beam emitted from the first cathode is incident on the anode at the first focal spot, and wherein the second cathode is positioned such that the electron beam emitted from the second cathode is incident on the anode at the second focal spot.

In some embodiments, the at least one cathode of the x-ray source comprises at least first and second cathodes, each of which is configured to emit electrons in a form of an electron beam, and wherein the at least one anode of the x-ray source comprises at least first and second anodes.

In some embodiments, the first and second anodes are connected to a common electrical feedthrough.

In some embodiments, the imaging device comprises a device, which is electrically connected to the first anode to reduce an electrical potential between the first anode and the first cathode compared to an electrical potential between the second anode and the second cathode when a same electrical potential is applied to the x-ray generator through the electrical feedthrough by a power supply.

In some embodiments, the device is an electrical resistor.

In some embodiments, the electrical resistor is a vacuum-compatible electrical resistor.

In some embodiments, the electrical resistor is connected in series with the first anode to reduce an energy of the x-ray radiation emitted from the first anode.

In some embodiments, activating the LE x-ray radiation and the HE x-ray radiation multiple times in the alternating exposure pattern as the gantry rotates the x-ray source and the x-ray detector around the object generates two sets of projection images in a single rotation of the gantry for dual energy CT reconstruction.

In some embodiments, a first set of the two sets of projection images is the LE projection images and a second set of the two sets of projection images is the HE projection images.

In some embodiments of the device, the at least one cathode of the x-ray source comprises at least first and second cathodes, each of which is configured to emit electrons in a form of an electron beam, wherein the at least one anode comprises one anode or two separate anodes, wherein the first and second focal spots are on the common anode or the two separate anodes, wherein the first cathode is positioned such that the electron beam emitted is incident on the first focal spot, and wherein the second cathode is positioned such that the electron beam emitted is incident on the second focal spot.

In some embodiments of the imaging device, the first and second anodes are connected to a common electrical feedthrough.

In some embodiments, the imaging device comprises a device, which is electrically connected to the first anode to reduce an electrical potential between the first anode and the first cathode compared to an electrical potential between the second anode and the second cathode when a same electrical potential is applied to the x-ray generator through the electrical feedthrough by a power supply.

In some embodiments of the imaging device, the device is an electrical resistor.

In some embodiments of the imaging device, the electrical resistor is connected in series with the first anode to reduce an energy of the x-ray radiation emitted from the first anode.

In some embodiments, the at least one cathode is an electron field emission cathode.

In some embodiments, the at least one cathode is a carbon nanotube-based electron field emission cathode.

In some embodiments, the controller is configured to independently program the exposure level of the LE x-ray radiation and the exposure level of the HE x-ray radiation to have a substantially similar imaging dose to reduce imaging noise.

In some embodiments, the x-ray source comprises at least a lower kV power supply, which is connected to the first anode, and a higher kV power supply, which is connected to the second anode.

In some embodiments, the at least one anode comprises at least a first anode and a second anode, the first anode comprising a different anode material from the second anode material, such that the first and second anodes generate two distinct x-ray spectra.

In another aspect, a multi-energy computed tomography (CT) imaging device is provided, the imaging device comprising: an x-ray source, which has at least one cathode and at least one anode and is configured to emit x-ray radiation from a plurality of focal spots for imaging an object; a plurality of spectral filters, each of which is positioned such that the x-ray radiation emitted from each of the plurality of focal spots is filtered by a corresponding one of the plurality of spectral filters to produce radiation with a unique spectrum; an x-ray beam collimator that is configured to confine the x-ray radiation emitted from each of the plurality of focal spots to substantially a same region of interest on, in, and/or about the object; an x-ray detector configured to detect x-ray radiation and form an x-ray image of the object, wherein the x-ray detector is positioned on a different side of the object relative to the x-ray source; a gantry configured to rotate the x-ray source and the x-ray detector around the object; a controller that is configured to (1) activate the x-ray source to provide the x-ray radiation from one of the plurality of focal points multiple times in a sequential exposure pattern as the x-ray source and the x-ray detector are rotated about the object, such that a projection image of the object is recorded by the x-ray detector for each exposure of the x-ray radiation; and (2) activate and program an exposure level of the x-ray exposures from one or more of the plurality of focal spots sequentially, wherein the exposure level of each of x-ray radiations is independent of others of the x-ray radiations; and one or more processing systems configured to reconstruct multi-energy CT images of the object using the projection images.

In some embodiments, the at least one cathode comprises a plurality of electron field emission cathodes and the at least one anode comprises a plurality of anodes.

In some embodiments, each anode of the plurality of anodes is connected to an electrical resistor configured to adjust an electrical potential between the anode to which the electrical resistor is connected and a corresponding one of the plurality of cathodes.

In some embodiments, the electrical resistor is configured to adjust the electrical potential from a common electrical potential provided from an anode power supply to each of the plurality of anodes.

In some embodiments, the x-ray source comprises a plurality of electrical potential inputs connected to a corresponding, or same, number of the at least one anode.

In some embodiments, the x-ray source comprises, for each of the at least one cathode, an electron beam focusing structure.

In some embodiments, the imaging device comprises a power supply configured to supply an electrical potential to each of the at least one anode.

In some embodiments, the imaging device comprises an electrical resistor that is connected in series between an anode of the at least one anode and the power supply, the electrical resistor being configured to reduce the electrical potential provided to the anode to which the electrical resistor is connected.

In some embodiments, the controller is configured to vary a resistance of the electrical resistor to vary the electrical potential provided to the anode to which the electrical resistor is connected as a function of the resistance.

In some embodiments, the electron beam focusing structure for each of the at least one cathode is configured such that the plurality of focal spots have a substantially similar focal spot size while the electrical potential between the anode, to which the electrical resistor is connected, and a corresponding cathode of the at least one cathode is varied by the controller.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

FIG. 5 is an example graphical illustration of a timing diagram showing an example of the data acquisition process of an mSCT imaging device, according to the disclosure herein.

FIG. 7 is a table containing the estimated imaging parameters for an example mSCT imaging device in single and dual energy modes and those of a conventional CBCT, according to the disclosure herein.

FIGS. 13A-D schematically show various methods of implementing DECT imaging.

DETAILED DESCRIPTION

The subject matter of the present disclosure provides a multi-source volumetric spectral CT (mSCT) imaging device. By using such an mSCT imaging device, the known disadvantages associated with imaging using cone-based computed tomography (CBCT), which are specifically associated with the large cone imaging angle necessary to image an object, are remedied by the use of an array of x-ray sources, each of which emits a cone-shaped x-ray pattern that covers (e.g., in an overlapping manner), a portion of the region of interest (ROI) of the object being imaged. The ROI of the object can be less than all or all of the object, depending on the size of the object being imaged Thus, the cone angle for each x-ray source of the mSCT imaging device can be reduced to an angle, or value, that is approximately the same as a diagnostic fan-beam multidetector CT (MDCT), which causes a large reduction of the x-ray scatter and cone-beam image artifacts, at least in comparison to a conventional CBCT imaging system. Thus, the mSCT imaging systems disclosed herein demonstrate a significant improvement in both CT image quality and diagnostic accuracy, compared to such conventional CBCT imaging systems, without increasing the radiation dose necessary to generate the requisite projection images. Such mSCT imaging devices further advantageously enable dual energy and/or multiple energy imaging, as well as virtual monoenergetic imaging (VMI) without requiring the use of an energy-sensitive flat panel area x-ray detector, which advantageously reduces the imaging artifacts induced by the presence of metallic structures in and/or around the object being imaged and, furthermore, provides quantitatively accurate measurement of the x-ray attenuation.

Figure 1A:
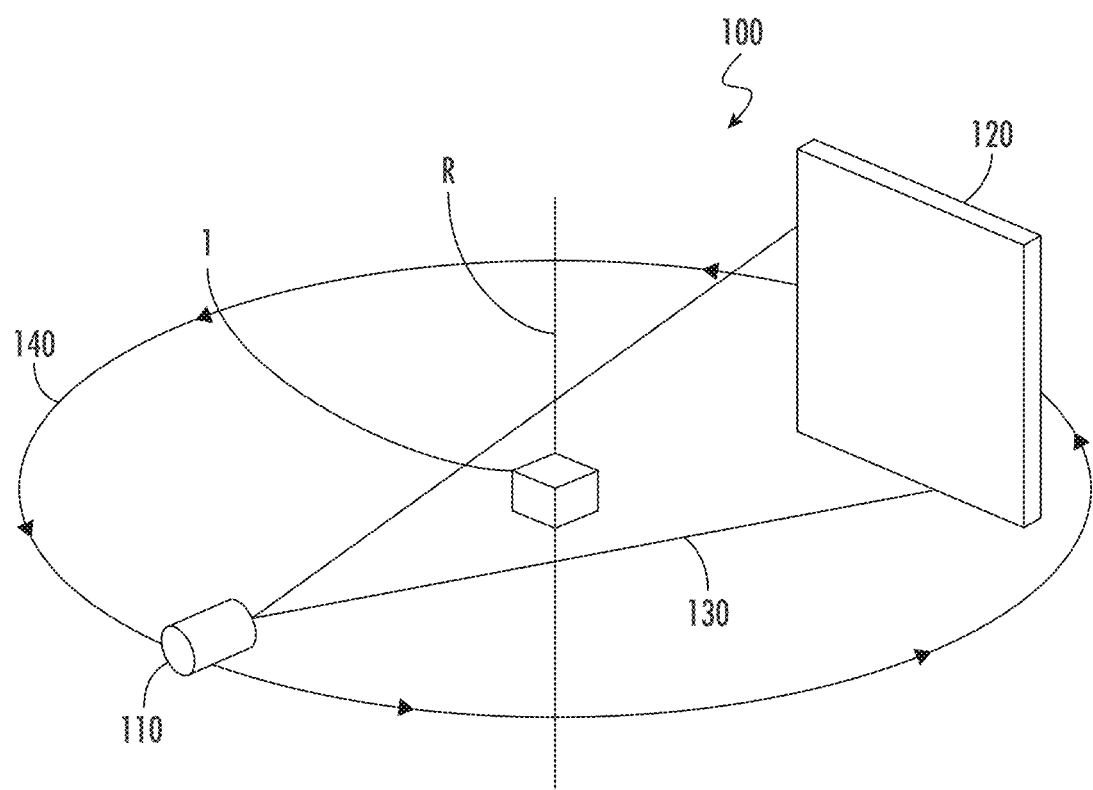
FIG. 1A shows an example prior art cone-based computed tomography (CBCT) imaging device.

Referring to FIG. 1A, an example of a prior art CBCT imaging device, generally designated 100, is shown therein. The CBCT imaging device 100 comprises an x-ray source 110 and a flat panel x-ray detector 120, which are arranged on opposite sides of the object 1 being imaged. The x-ray source 110 generates a cone-shaped x-ray beam 112 that is directed towards and incident upon the x-ray detector 120. The object 1 being imaged is placed in the center of the CBCT imaging device 100, within the x-ray beam 112, and the x-ray source 110 and x-ray detector 120 rotate around the object 1, which defines the axis of rotation R of the CBCT imaging device 100. Thus, the x-ray source 110 and the x-ray detector 120 move along the rotation path 140 simultaneously, or in unison, with each other.

Figure 1B:
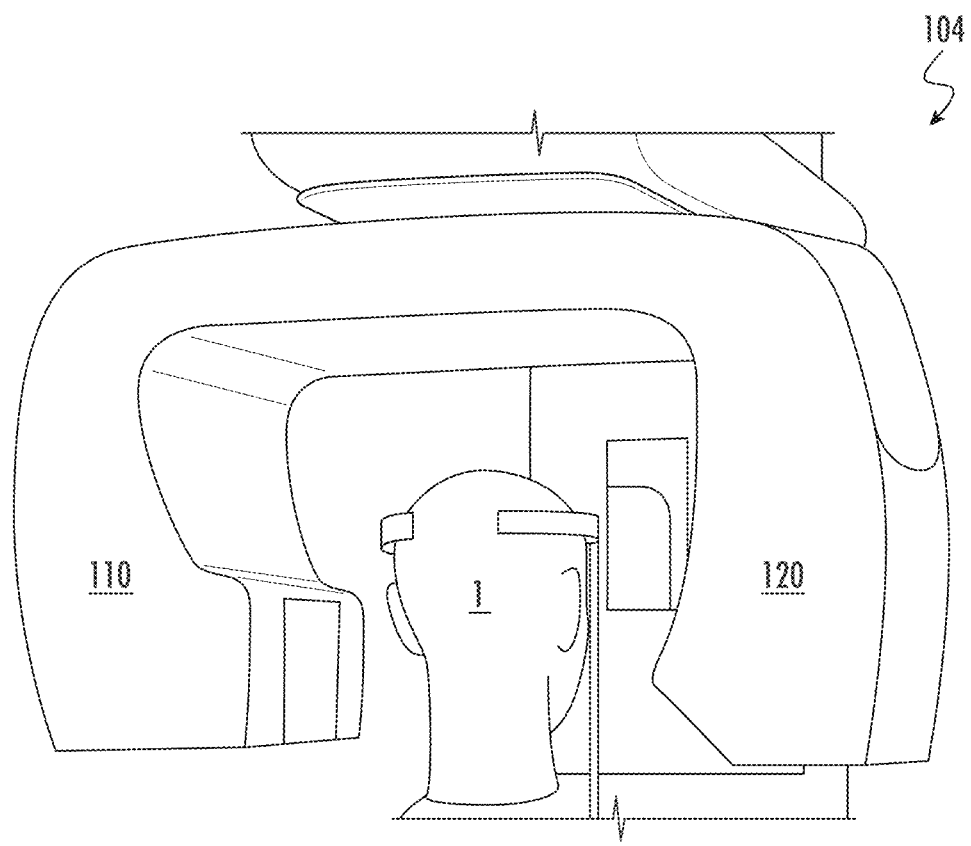
FIG. 1B shows another example embodiment of a prior art CBCT device for use in dental imaging.
Figure 1C:
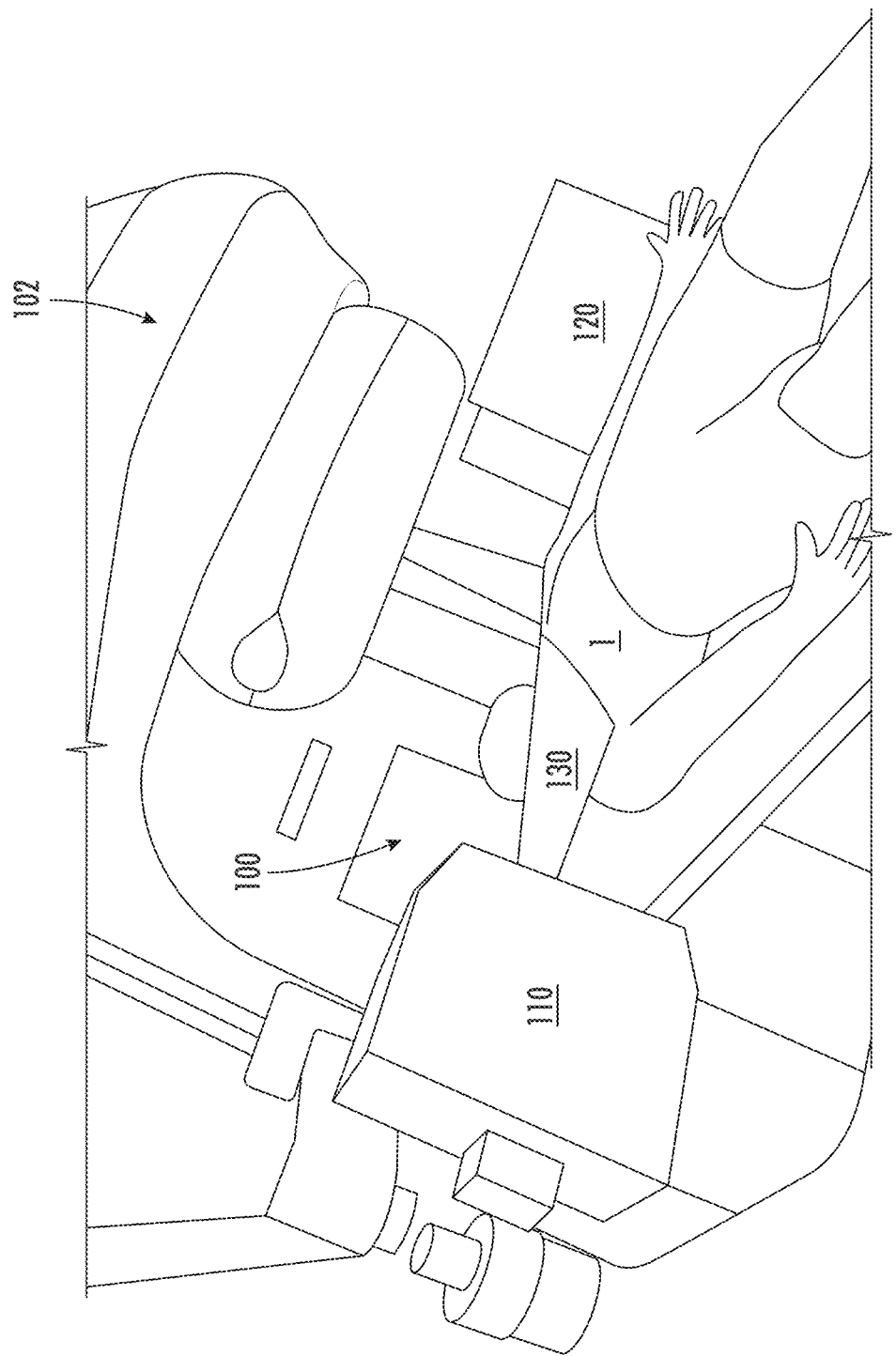
FIG. 1C schematically shows another example embodiment of a prior art on-board CBCT imaging system incorporated in a radiation therapy device.

FIG. 1B shows an example embodiment of the prior art CBCT imaging device of FIG. 1A, with the object 1 being positioned between the x-ray source and the x-ray detector of the dental imaging device, generally designated 101, such that the x-ray source and the x-ray detector will rotate about an axis of rotation defined by the object 1, such as when used for dental imaging. FIG. 1C shows an example embodiment of the prior art CBCT imaging device 100 of FIG. 1A incorporated in a radiation therapy device, generally designated 102. In this example, the CBCT imaging device 100 is used to assist the radiation therapy device 102 in improving the efficacy and efficiency of the radiation therapy being performed on the object 1.

Figure 2A:
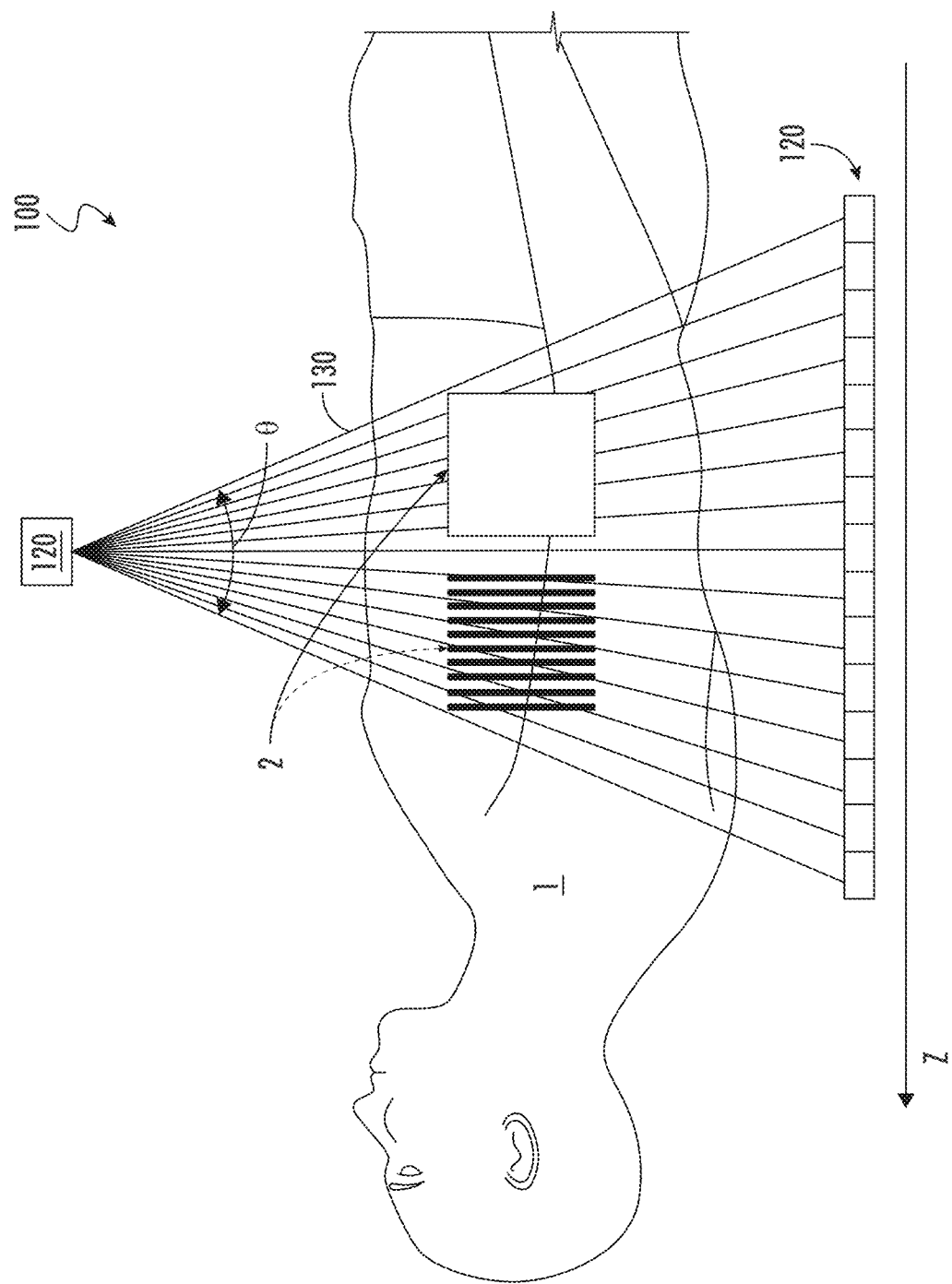
FIG. 2A schematically shows a cone beam generated using an example embodiment of a prior art CBCT device for imaging structures, anatomical or otherwise, that are internal to a human body.
Figure 2B:
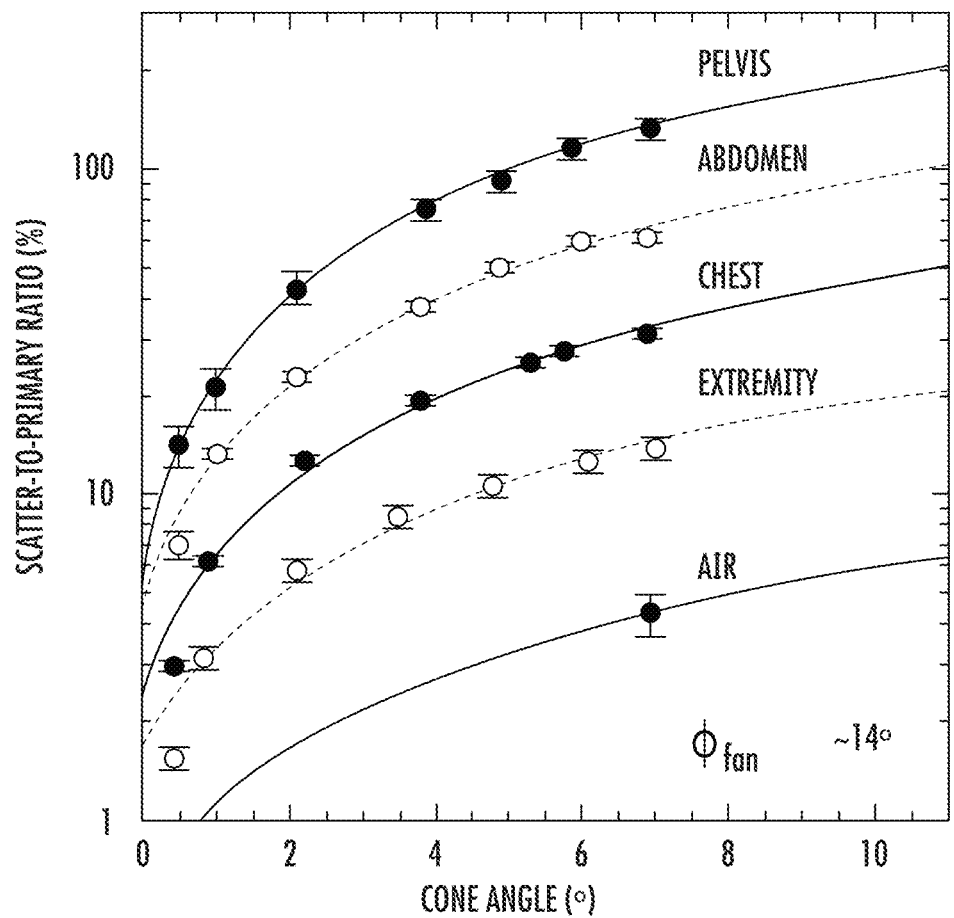
FIG. 2B is a graphical representation of cone angle v. scatter radiation for a prior art CBCT device.

FIG. 2A schematically shows a cone-shaped x-ray beam 130, which is generated by an x-ray source 110 of a CBCT imaging device, and indistinguishable objects 1 contained within the body of the subject (e.g., a human) being imaged. The cone-shaped x-ray beam has a cone angle $\theta$ and is incident on a flat panel x-ray detector 120 arranged on an opposite side of the objects 1 from the x-ray source 110. As shown in FIG. 2A, the geometry of the x-ray beam 130 reduces the sensitivity of the CBCT imaging device, since the small distances that separate the plates in the left object 1 are rendered indistinguishable from the solid right object 1, due to the angle of the x-ray beam 130. FIG. 2B is a graphical plot showing that, as the cone angle $\theta$ increases, the scatter-to-primary ratio (%) of radiation also increases. (Siewerdsen J H, Jaffray D A. Cone-beam computed tomography with a flat-panel imager: Magnitude and effects of x-ray scatter. Med Phys. 2000; 28(2):220, the entire contents of which are expressly incorporated herein by reference.) Since the cone angle $\theta$ of a typical CBCT imaging device is about 15°, it is common for conventional CBCT imaging devices to have very high scatter-to-primary ratios for radiation.

Figure 3A:
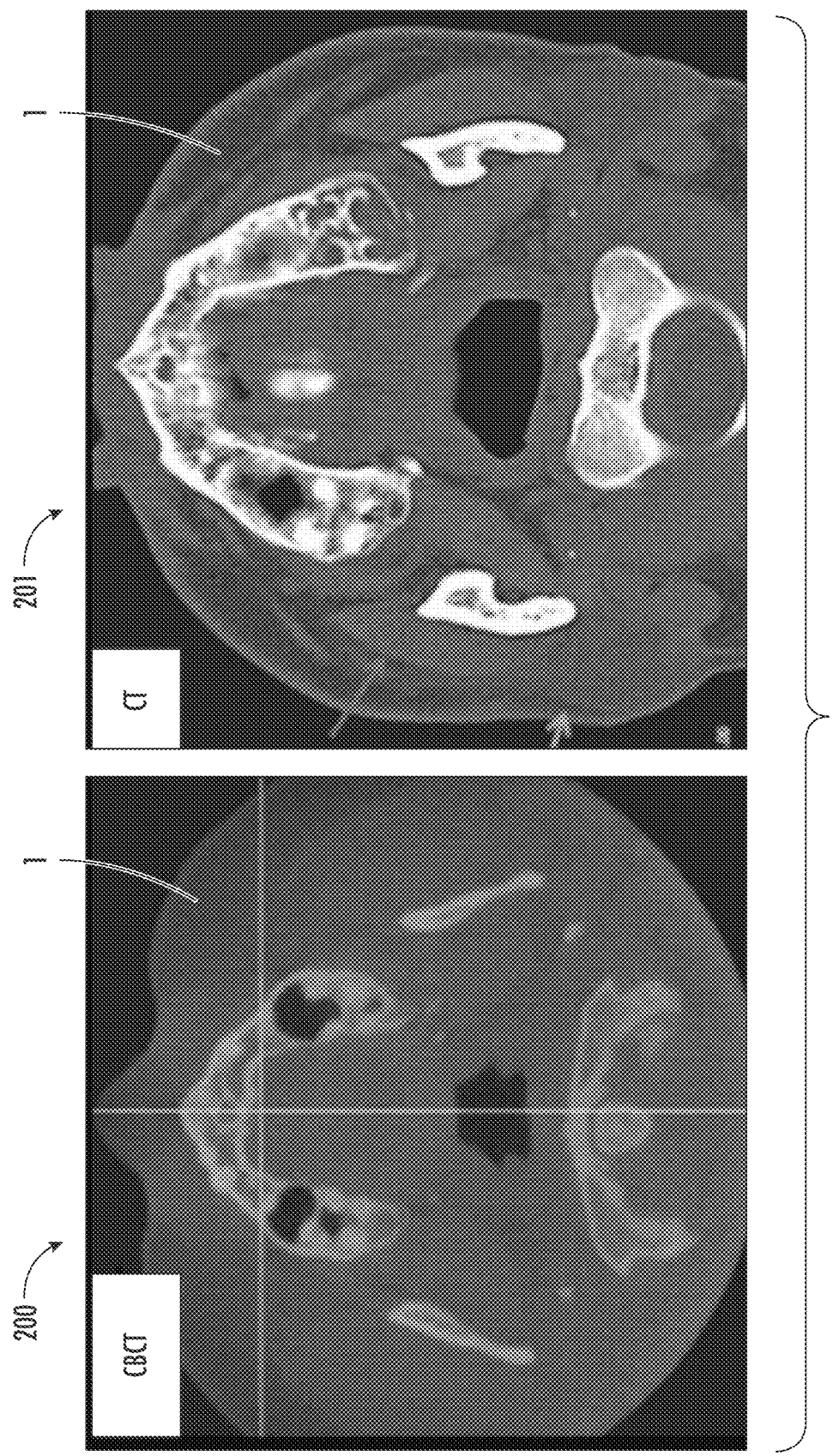
FIG. 3A is a set of images, the left image having been generated using a prior art CBCT device and the right image having been generated using a prior art fan-beam CT device, the set of images showing the low-contrast resolution in CBCT imaging compared to conventional CT imaging.

Referring to FIG. 3A, a set of images is shown therein. The CBCT image, generally designated 200, is generated using a conventional CBCT imaging device. The fan-beam CT image, generally designated 201, is generated using a conventional fan-beam CT imaging device. As shown in the CBCT image 200, obtained using a conventional CBCT imaging device, the large cone angle causes significantly higher scatter radiation compared to the fan-beam CT image 201, obtained using a conventional fan-beam CT imaging device. The higher scatter radiation associated with conventional CBCT imaging devices is shown by the difference in contrast between the CBCT and fan-beam CT images 200, 201. (Angelopoulos C, Scarfe W C, Farman A G. A Comparison of Maxillofacial CBCT and Medical CT. Atlas Oral Maxillofacial Surg Clin N Am. 2012; 20:1-17, the entire contents of which are expressly incorporated herein by reference.) In comparison to the fan-beam CT image 201, soft tissue structures of the object 1 being imaged are almost impossible to identify in the CBCT image 200, but are visible in the fan-beam CT image 201.

Figure 3B:
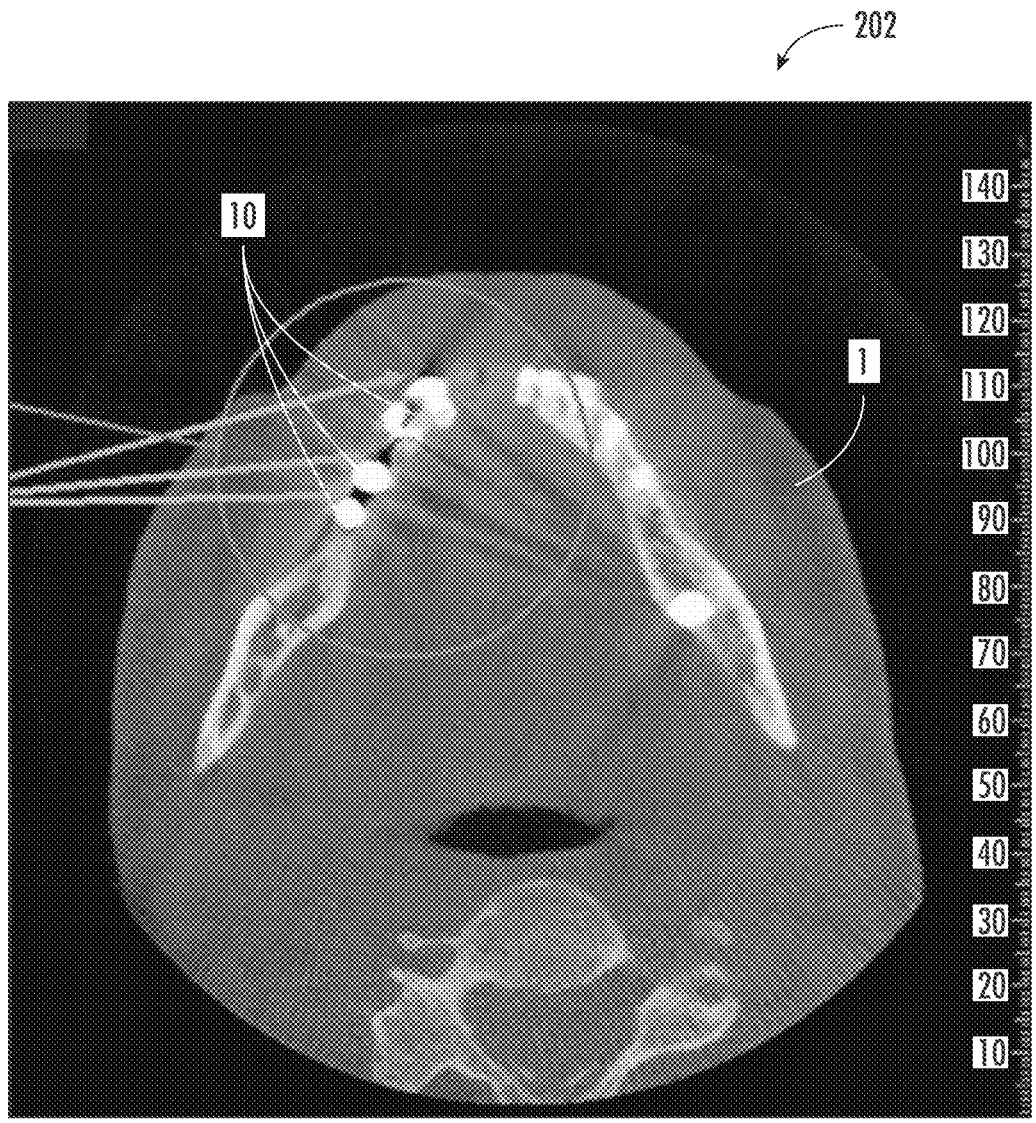
FIG. 3B is a CBCT reconstructed patient image obtained using a prior art CBCT device, in which metal artifacts, or structures, were present in the specimen during imaging.

Referring to FIG. 3B, a CBCT reconstructed image, generally designated 202, of an object 1, which contains metallic structures 10 implanted therein, is shown. As shown in the CBCT reconstructed image 202, the metallic structures 10 (e.g., in the form of dental implants) cause imaging artifacts, which are generally in the form of streaks and/or dark halos around the metallic structures 10 in the reconstructed CBCT image 202, which reduce the reliability of such reconstructed CBCT image(s) 202 for diagnostic purposes. The example reconstructed CBCT image 202 is generated along an axial plane in a patient with a metallic dental implant in the mandible.

Referring to FIG. 3C, a set of images of an object 1 comprising metallic structures 10 is shown therein. In the CBCT image, generally designated 203, the imaging artifacts associated with the metallic structures obscure imaging fidelity of some of the soft tissue that surrounds the metallic structures 10. The virtual monoenergetic image (VMI), generally designated 204, is synthesized from spectral CT imaging. In the VMI 204, less of the soft tissue that surrounds the metallic structures 10 is obscured, thereby increasing imaging fidelity around these metallic structures 10. (Große Hokamp N, Laukamp K R, Lennartz S, Zopfs D, Abdullayev N, Neuhaus V F, Maintz D, Borggrefe J. Artifact reduction from dental implants using virtual monoenergetic reconstructions from novel spectral detector CT. Eur J Radiol. 2018; 104:136-42. Epub 2018/04/27. doi: 10.1016/ j.ejrad.2018.04.018. PubMed PMID: 29857859, the entire contents of which are expressly incorporated herein by reference.)

Figure 4A:
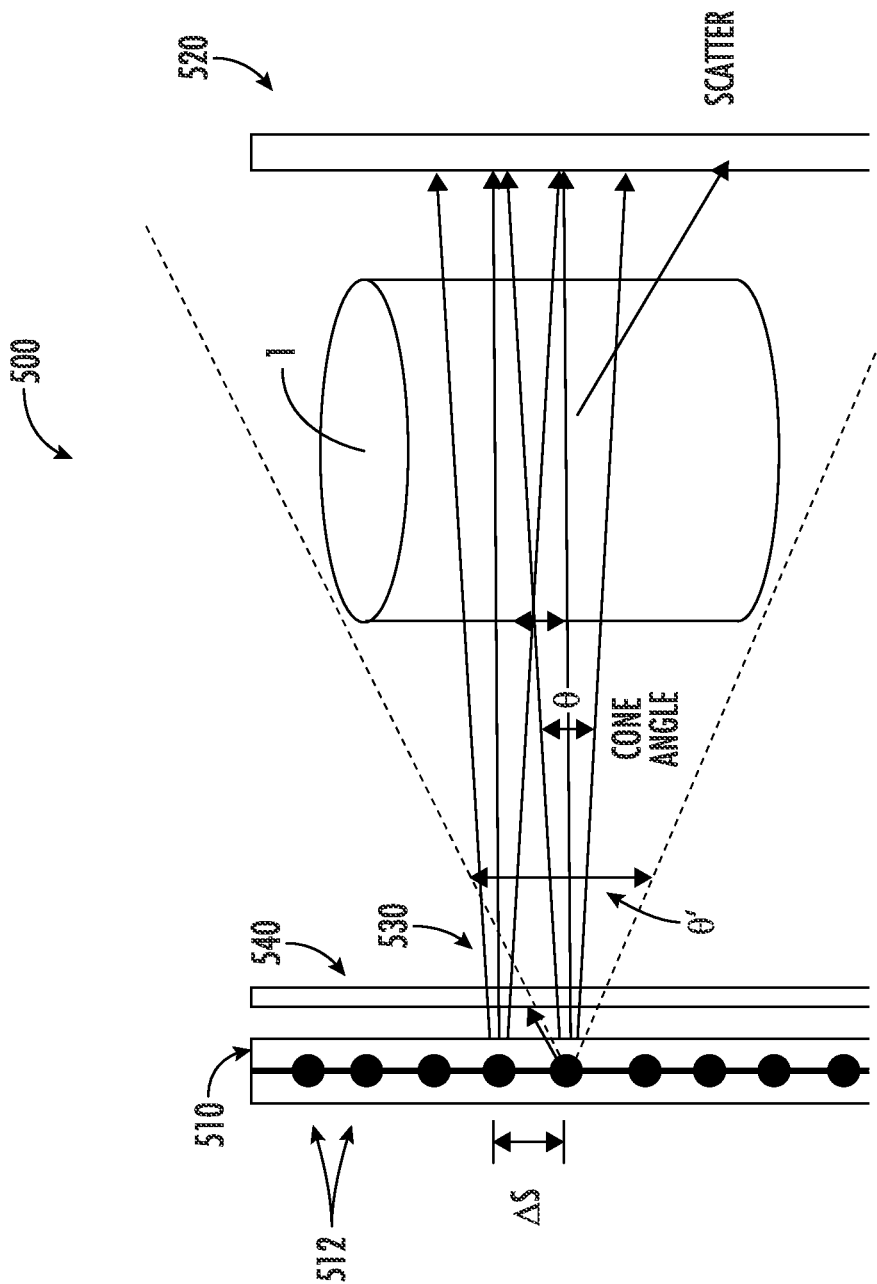
FIG. 4A schematically shows an example embodiment of a volumetric spectral computed tomography (mSCT) imaging device or system, according to the disclosure herein.

Referring to FIG. 4A, an example embodiment of an volumetric spectral computed tomography (mSCT) imaging device, generally designated 500, or system is illustrated schematically therein. In mSCT, the imaging space is segmented by multiple x-ray beams, generally designated 530, each of which has a narrow cone angle θ. θ' shows the comparatively broader cone angle associated with the use of a conventional CBCT imaging device (e.g., 100, see FIG. 1A) and is further indicated by the region contained within the broken lines. The x-ray beams 530 are activated sequentially, each passing through, or irradiating, a portion of the object 1 being imaged. The scattered photons that are incident on the x-ray detector 520, outside the corresponding narrow detector band anticipated for each x-ray beam are rejected. The mSCT imaging device 500 comprises a linear x-ray source array, generally designated 510, which comprises a plurality of x-ray sources 512 (e.g., "focal spots") that are spaced apart from each other along the length of the x-ray source array 510. The radiation emitted from each of the x-ray sources 512 is collimated, using a collimator 540, such that each x-ray source produces an x-ray beam 530 that has a narrow cone angle θ associated therewith. The collimator 540 is positioned adjacent to the x-ray source array 510, between the x-ray source array 510 and the object 1 being imaged. In some embodiments, the collimator 540 is configured to cover only a portion of (i.e., less than an entirety of, including less than a majority of) the object 1 being imaged.

In some embodiments, the collimator 540 is a fan-beam collimator with an array of apertures. Each aperture is configured to confine the radiation from a single x-ray source 512 to an x-ray beam 530 with a narrow cone angle θ. In some such example embodiments, the collimator 540 is attached (e.g., directly or indirectly) to the x-ray source array 510. In some embodiments, the mSCT imaging is performed in a simple step-and-shoot mode, in which, since the x-ray source array 510 has, for example, a quantity of "M" x-ray sources 512, which are configured to be activated sequentially to electronically scan (e.g., in the direction of extension of the x-ray source array 510) across the object 1 while the x-ray source array 510 and the x-ray detector 520 is positionally fixed at one of a quantity of "N" viewing angles defined about the object 1 in a circumferential direction. After all "M" (or a designated portion thereof) of the x-ray sources 510 have been activated at a single one of the "N" viewing angle, the x-ray source array 510 and the x-ray detector 520 are rotated, about an axis of rotation defined by the object 1, to another (e.g., an adjacent, or next) of the "N" viewing angles and another scan (e.g., activation of all, or a designated portion of, of the x-ray sources 512) of the object 1 is performed, following the timing diagram illustrated in FIG. 5. This process repeats until the x-ray source array 510 and the x-ray detector 520 have been rotated to each of the "N" viewing angles, which is typically either 180° plus the cone angle θ (i.e., 180°+the cone angle θ) or 360 degrees. For each x-ray exposure (e.g., activation and/or energizing of one of the x-ray sources 512), an image of a portion of the object 1 being imaged is recorded on a portion of the x-ray detector 520, referred to as a "detector band" that corresponds to only a single, or multiples of, the x-ray sources 512. Any scattered photon from an x-ray source 512 that is received by the x-ray detector outside of the "detector band" that corresponds to the x-ray source 512 that was activated, or energized, is rejected. During mSCT imaging according to the steps of the example process disclosed herein, a total of the product of the "M" x-ray sources 512 multiplied by the "N" viewing angles defines the number of projection images of the object that are collected.

In some embodiments, the x-ray detector 520 is a digital area x-ray detector that uses a dynamic band reading method, or region-of-interest (ROI) readout, to increase a data readout speed of the digital area x-ray detector. After exposure of the digital area x-ray detector from each collimated x-ray beam, only a "band," or ROI, of the x-ray detector that receives primary transmitted x-ray photons is read by the digital area x-ray detector instead of the entire detector which the amount of the data read and transmitted.

Figure 4B:
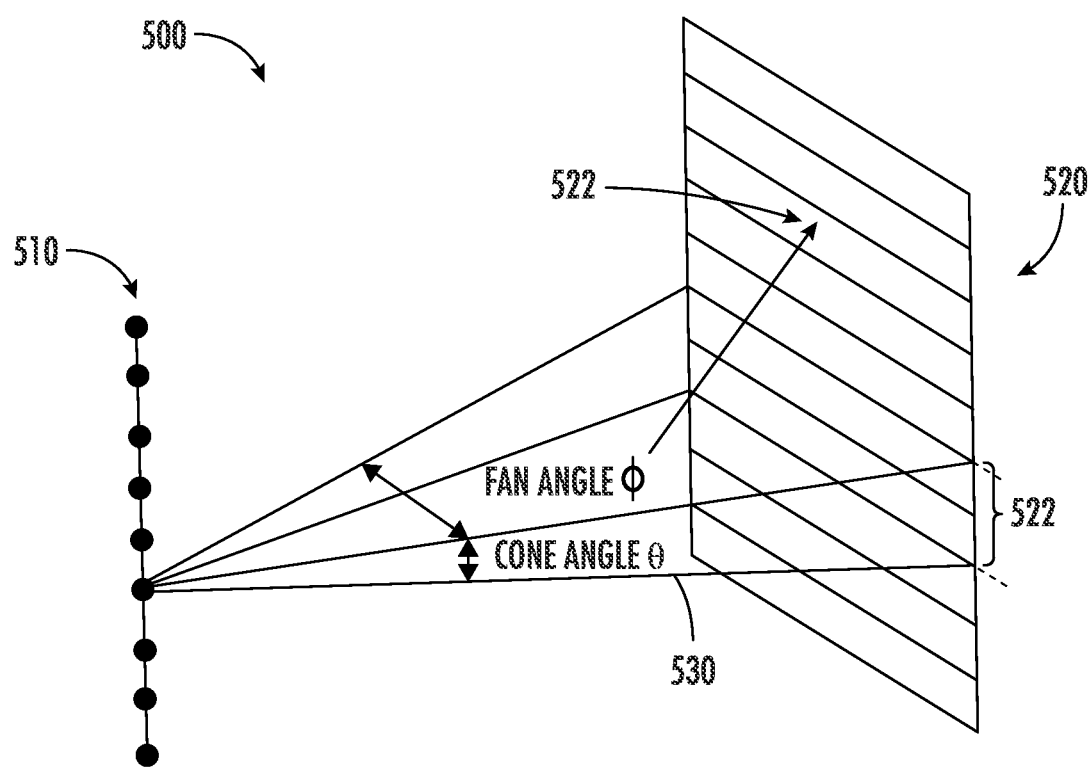
FIG. 4B schematically shows the x-ray beam from a collimated source in the array on the flat panel detector, as is used in an mSCT imaging device, according to the disclosure herein.

Referring to FIG. 4B, another example embodiment of an mSCT imaging device, generally designated 501 is shown, which is configured to operate in a so-called continuous rotation mode. The mSCT imaging device 501 is substantially similar to, or identical to, the mSCT imaging device 500 in ways other than operation and/or function, but is configured to operate in this continuous rotation mode. In this continuous rotation mode, while the x-ray source array 510 and the x-ray detector 520 rotate simultaneously, or in unison, about the object 1 being imaged by the incremental angle $\Delta\phi$, each of the "M" x-ray sources 512 in the x-ray source array 510 are activated (e.g., sequentially) to electronically scan (e.g., create a projection image for each of the x-ray sources 512) the object 1, for example, in the direction of extension of the x-ray source array 510. The mSCT imaging device 500 of FIG. 4B is configured to repeat this process "$N_{view}$" times, which corresponds to the total range of rotation of the x-ray source array 510 and the x-ray detector 520 about the object 1, divided by incremental angles $\Delta\phi$. Thus, the total angle the x-ray source array 510 and the x-ray detector 520 rotate around the object 1 is expressed by the equation $N_{view}*\Delta\phi$, which can be, for example and without limitation, 180°+cone angle θ, 360°, or any other desired angle of rotation. Due to this continuous motion of the x-ray source array 510 and the x-ray detector 520 about the object 1 during imaging, the viewing angle for each x-ray exposure, or projection image, will be slightly different from all others, since only one x-ray source 512 is activated, or energized, at a time (e.g., multiple x-ray sources 512 are not activated simultaneously). The different viewing angles for each x-ray exposure is accounted for during image reconstruction. During mSCT imaging according to the steps of the example process disclosed herein, a total of the product of the "M" x-ray sources 512 multiplied by the "$N_{view}$" viewing angles defines the number of projection images of the object that are collected.

The mSCT imaging devices 500, 501 are essentially fan-beam CT imaging devices, each having an x-ray source array 510 and an x-ray detector 520 that extend, respectively, in the axial direction to cover a large field-of-view without requiring movement of the object being imaged (e.g., without patient translation). Using the geometry of a typical dental CBCT, it is estimated that the cone angle can be decreased from about 15° in a conventional CBCT imaging device to about 3° in the example mSCT imaging devices 500, 501 disclosed herein. Such a reduction in cone angle reduces the scatter-to-primary ratio by a factor of about 5.

In another example embodiment, the mSCT imaging device is configured to be used to perform dual-energy CT (DECT) imaging. Spectral CT or virtual monoenergetic imaging (VMI) synthesized from DECT data reduces imaging artifacts caused by materials with high atomic numbers, such as is common in metallic structures implanted within a human body.

Figure 6:
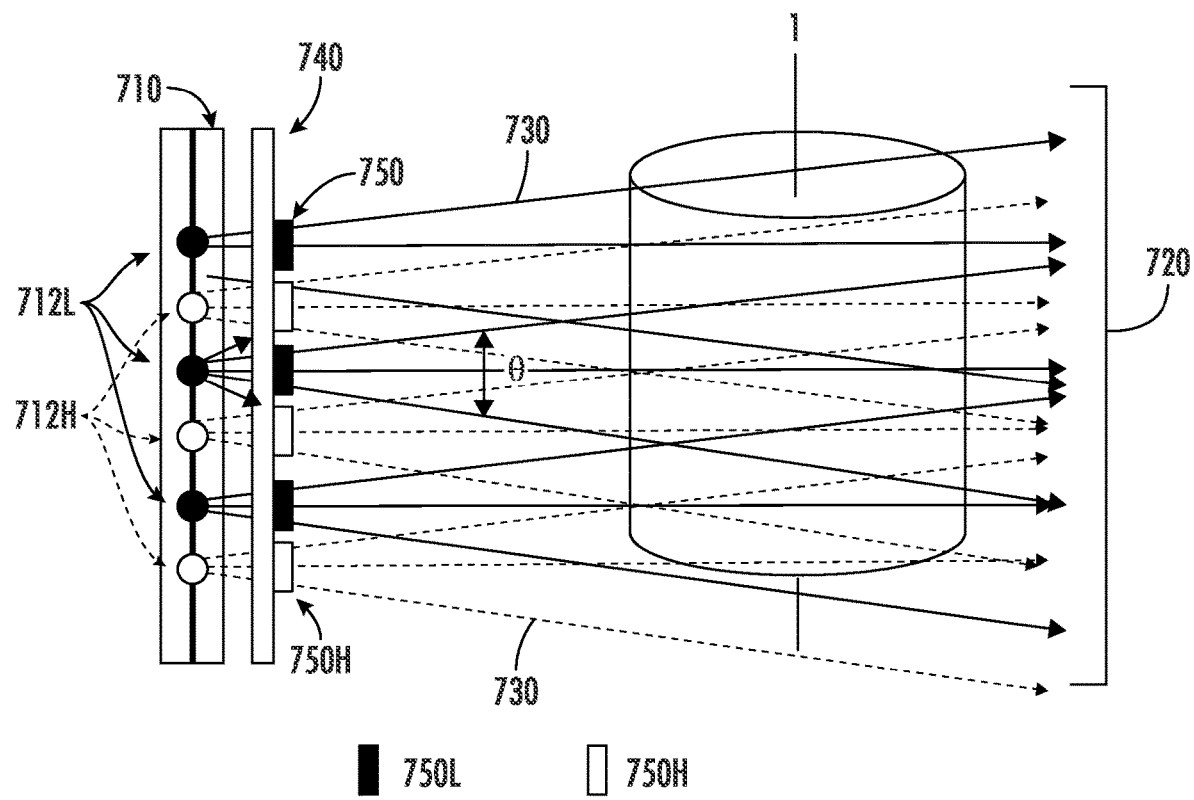
FIG. 6 schematically shows an example embodiment of a dual energy CT (DECT) imaging of an object using mSCT, according to the disclosure herein.

According to another example embodiment, an mSCT imaging device, generally designated 700, is shown in FIG. 6. This mSCT imaging device 700 is configured to allow DECT imaging at low cost, without the need to use an energy-sensitive area x-ray detector. As shown in FIG. 6, the mSCT imaging device 700 is substantially similar to the mSCT imaging devices 500, 501, but the x-ray source array 710 is divided into a first set of x-ray sources, generally designated 712L, and a second set of x-ray sources, generally designated 712H.

The mSCT imaging device 700 comprises a plurality of first filters 750L, each of which is positioned adjacent to one of the first group of x-ray sources 712L (e.g., between an x-ray source 712L and the object 1 being imaged), such that x-ray radiation emitted from every one of the first group of x-ray sources 750L is filtered by one of the first filters 750L, which comprise a first material that preferentially attenuates high-energy photons to produce a low mean energy (LE) x-ray spectrum. In some embodiments, the quantity of first filters 750L is the same as the quantity of the x-ray sources 712L in the first group of the x-ray sources 712L. The mSCT imaging device 700 also comprises a plurality of second filters 750H, each of which is positioned adjacent to one of the second group of x-ray sources 712H (e.g., between an x-ray source 712H and the object 1 being imaged), such that x-ray radiation emitted from every one of the second group of x-ray sources 712H is filtered by one of the second filters 750H, which comprise a second material that preferentially attenuates low energy photons to produce a high mean energy (HE) x-ray spectrum.

Thus, each x-ray source 712L can be referred to herein interchangeably as "LE x-ray source 712L," each x-ray source 712H can be referred to herein interchangeably as "HE x-ray source 712H," each first filter 750L can be referred to herein interchangeably as "LE filter 750L," and each second filter 750H can be referred to herein interchangeably as "HE filter 750H." However, the LE x-ray sources 712L are substantially identical to, and emit an x-ray beam that is substantially similar in terms of x-ray energy spectra to, the HE x-ray sources 712H. The differentiation of x-ray spectra energy is produced based on whether the x-ray beam passes through an LE filter 750L or an HE filter 750H. In the example embodiment shown, the LE x-ray sources 712L are positioned, along the length of the x-ray source array 710, between the HE x-ray sources 712H in an alternating pattern, in which, other than a first and a last x-ray source of the x-ray source array 710, each LE x-ray source 712L is adjacent to, or positioned between, HE x-ray sources 712H and each HE x-ray source 712H is adjacent to, or positioned between, LE x-ray sources 712L. As such, the LE and HE x-ray sources 712L, 712H are arranged, respectively, as pairs that are adjacent to each other along the length of the x-ray source array 710, each pair comprising one LE x-ray source 712L and one HE x-ray source 712H.

The aggregation of the projection images from each set of the x-ray sources 712L and 712H is sufficient to reconstruct the CT image of the object 1 at the corresponding energy spectrum. Thus, during a single rotation (e.g., about 360°) of the x-ray source array 710 and the x-ray detector 720 around the object 1, two complete sets of CT images are generated, a first set of CT images being generated at low energy from the x-ray sources 712L and a second set of CT images being generated at high energy from the x-ray sources 712H. The mSCT imaging device 700 is operable without using an energy-sensitive area x-ray detector, which are known to be prohibitively expensive (e.g., to the point of rendering the. In a further example embodiment, CT imaging at more than two energy levels can also be performed by using multiple (e.g., more than two) energy filters.

In some embodiments of the mSCT imaging device 700, the HE filter 750H comprises, for example and without limitation, a thin foil of copper, which preferentially attenuates more (e.g., a greater proportion of) low energy photons and thereby is operable to increase the mean energy of the resulting photon spectrum emitted from the HE filter 750H towards the object 1 being imaged. In some embodiments of the mSCT imaging device 700, the LE filter 750L comprises, for example and without limitation, a thin foil of tantalum or tin, which preferentially attenuates more (e.g., a greater proportion of) high energy photons and thereby is operable to reduce the mean energy of the resulting photon spectrum emitted from the LE filter 750L towards the object 1 being imaged. Each set of projection images will be reconstructed separately into high and low energy CT images. Stated somewhat differently, all of the projection images generated while any of the LE x-ray sources 712L is activated are reconstructed to produce low energy CT image(s) and all of the projection images generated while any of the HE x-ray sources 712H is activated are reconstructed to produce high energy CT image(s).

By decomposing each image voxel into two base materials their density at each voxel can be obtained. With pre-calibrated energy dependence of mass attenuation of each material, virtual monochromatic energy images of the object can be obtained at any suitable energy level. In some embodiments, the dual energy datasets (e.g., image projections and/or CT images) generated using the mSCT imaging device 700 are suitable for use in synthesizing virtual monoenergetic CT images. By measuring the attenuations at two different energies, the effective atomic number and the density of the two basis materials (for example, water and iodine) in a voxel can be determined. The image-based materials decomposition method can be used for mSCT imaging as the two sets of projection images are obtained from x-ray source positions that are offset from each other. In this case, the mass density $\rho_{1,2}$ of the two basis materials is obtained from the reconstructed high and low energy images as $$\mu^k \widetilde{\mu_1}\ (E_k)\rho_1 \widetilde{\mu_2}\ (E_k)\Sigma_2,\ k=H,L$$

where k=H, L represents the image obtained at high or low energy, respectively, and where $\mu_{1,2}(E_k)$ represents the mass attenuation coefficients of the two basis materials at the two energies. The values of $\mu_{1,2}(E)$ are determined empirically by measuring the CT numbers for different concentrations of the two basis materials in low- and high-energy scans. The density of two basis materials can then be obtained from solving the two linear equations. With this information, a VMI image at any energy E can be constructed. The VMI images are less prone to have imaging artifacts as the result of the presence of metallic structures within, about, and/or around the object being imaged, which increases imaging fidelity and, therefore, the diagnostic accuracy of the resultant images.

FIG. 7 is a table that shows the estimated imaging parameters for an example mSCT imaging device of the present disclosure in single- and dual-energy modes. As shown in the table, the total exposure from each source in mSCT is assumed to be the same as using a comparable CBCT. The total entrance dose from the high-energy (HE) and low-energy (LE) CT imaging is assumed to be the same as the single energy scan. Because of filtration and to maintain the same total entrance dose the mAs is estimated to increase by ×3. The last row lists the typical imaging protocol of a commercial dental CBCT.

In another example embodiment, the mSCT imaging device can also be used to perform fast tomosynthesis imaging without mechanically moving the x-ray source, the x-ray detector, or the object (e.g., human or other living being) being imaged. Tomosynthesis is a fast and low-dose quasi-3D imaging modality that is can be advantageous compared to CT when internal organ motion during treatment delivery is an issue, for example in high dose stereotactic body radiation therapy. The currently utilized method uses multiple CBCT scans to monitor the motion of the internal organs, which significantly increases both the time needed to perform the imaging and also the radiation dose to which the patient is exposed during such imaging.

In another embodiment of the present disclosure, the mSCT device can also be used to perform fast tomosynthesis imaging without mechanically moving the source, detector, or subject being imaged. Tomosynthesis is a fast and low-dose quasi-3D imaging modality. It is potentially advantageous compared to CT when internal organ motion during treatment delivery is an issue, for example in high dose stereotactic body radiation therapy. The current approach of using multiple CBCT scans to monitor the motion significantly increases the time and dose to the patient. Using the multiple x-ray sources and the flat-panel detector in mSCT tomosynthesis imaging of the patient can be performed without gantry movement in a few seconds (compared to 60-120 sec for one CBCT scan). The fan-beam collimator is replaced by a multiple beam cone beam collimator. The radiation from each source is collimated to cover the entire FOV to form a projection image of the object from a particular viewing angle. By electronically activating multiple x-ray sources in the array sequentially, a set of projection images are collected without movement of the source, detector or object. The images are then reconstructed into a stack of tomosynthesis slices by a tomosynthesis reconstruction algorithm.

In another example embodiment, an mSCT imaging device can be used to perform physiologically gated tomosynthesis imaging using the same source array and the same flat panel detector, without requiring any mechanical movement thereof. In an example, the mSCT imaging device is used for respiratory gated tomosynthesis imaging of the lung(s) of a subject, or patient, for example, a human subject for image-guided radiation therapy. According to this example embodiment, a respiratory signal from the subject being imaged is used to trigger activation of the x-ray sources and the x-ray detectors and, necessarily, to activate data collection from such x-ray sources and/or x-ray detectors. According to this example embodiment, during which phase of the respiratory cycle that the series of x-ray projection images are generated can be selected based on individual diagnostic considerations. In some embodiments, the selection of the phase of the respiratory cycle can be selected from a graphical user interface (GUI), for example, on a touchscreen device. Since each projection image is generated during a particular phase and time window during a respiratory cycle, image blur of the resultant projection images due to motion of the lung is minimized. In some embodiments, the triggering signal is used to control the electron emission from one or more of the x-ray sources. In such embodiments, electron emission is activated when a signal is received to activate a corresponding one of the x-ray sources and the electron emission is deactivated at the end of the x-ray exposure, such as upon receipt of a deactivation signal or after a prescribed period of time has elapsed.

In another example embodiment, such mSCT imaging devices can be used for tomosynthesis imaging of an object from a projected view that is spanned by a two-dimensional (2D) area. In such an example embodiment, the x-ray radiation from each x-ray source in the x-ray source array is collimated to illuminate the entirety of the object, such that, as the "M" x-ray sources are sequentially activated, the projection view of the object is spanned by $\Delta\theta$, as defined by the cone beam direction. As the x-ray source array and the x-ray detector rotate simultaneously, or in unison, around the object being imaged by angle $\Delta\phi$ in "$N_{view}$" steps, as defined by the fan beam direction, the total solid viewing angle spanned is $\Delta\phi \times \Delta\theta$. The collection of the quantity of "$N_{view}$"×"M" projection images are used for tomosynthesis reconstruction of the object from a distribution of sources in a 2D area x-ray source array (e.g., spanning in both x and y directions, as defined using typical cartesian coordinates, with the z direction generally being defined as the direction between the array and the object and/or the x-ray detector). Tomosynthesis images that are produced using such a 2D area x-ray source array is of superior quality to that of tomosynthesis images that are produced using a 1D, or linear, x-ray source array in either the cone beam direction or the fan beam direction.

In another example embodiment, the mSCT imaging device comprises multiple individual x-ray tubes that are linearly positioned (e.g., along a line) along the axial direction of the object.

In another example embodiment, the mSCT imaging device comprises a scanning electron beam x-ray source. In such an embodiment, the electron beam generated by an electron cathode is "steered" (e.g., pointed, in a controllable manner) by an electromagnetic field to different points on the x-ray anode, so that the x-ray radiation is emitted from different origin positions on the x-ray anode based on the position on the x-ray anode on which the electron beam is incident. In another example embodiment, a spatially distributed x-ray source array is used. The x-ray source array can use either an array of thermionic cathodes or an array of field emission cathodes.

In another example embodiment, the mSCT imaging device comprises a spatially distributed x-ray source array, which uses carbon nanotube (CNT) field emission cathodes. The plurality of cathodes are distributed linearly (e.g., along a line) on either one or a plurality of x-ray anodes. The entire x-ray source array is contained inside an evacuated (e.g., negatively pressurized, such as in a vacuum) metal housing. A high voltage difference is established between the cathode(s) and the anode(s). X-ray radiation from a specific focal spot is emitted by applying a bias electric field between the corresponding cathode and gate electrode. By switching on and off the bias field applied to the individual electron source, a scanning x-ray beam is generated.

CNT x-ray source arrays with different configurations and specifications have been determined to be advantageous for use in mSCT for at least the following reasons: (1) x-ray generation can be rapidly switched and synchronized with data acquisition; (2) x-ray source arrays with small inter-source spacing can be fabricated; (3) the x-ray source array is compact and relatively light weight, thereby allowing retrofitting of current CBCT scanners with such x-ray source arrays for mSCT imaging. At the same focal spot size, each x-ray source of the CNT x-ray source array can generate the same x-ray photon flux as a conventional x-ray tube. This has been determined to be sufficient for the example mSCT imaging devices disclosed herein, as illustrated in FIG. 7. For the mSCT imaging device, it is possible to use an x-ray source with the specification comparable to that which is used in current dental CBCT systems, which provides sufficient x-ray photon flux for the intended imaging time in both single and dual energy CT imaging modalities.

To achieve the same imaging time ($T_{scan}$), mSCT imaging requires a faster detector readout compared to conventional CBCT imaging. The primary reason for this is due to the large increase in the quantity of the image projections (e.g., frames) captured and recorded. The detector readout time and x-ray exposure time per projection image per x-ray source can be calculated by the following equation:

$$\Delta t_{exp} = \frac{mAs_{total}}{N_{view} \times I_{tube}}; \Delta t_{readout} = \frac{T_{scan}}{N_{view} \times N_{source}} - \Delta t_{exp}^1$$

Where, $mAs_{total}$ (milliampere×second) is the total x-ray exposure, $N_{source}$ is the quantity of x-ray sources used for the mSCT imaging operation, $N_{view}$ is the quantity of projection views recorded from each x-ray source, $I_{tube}$ is the x-ray tube current, $\Delta t_{exp}$ is the time that elapses per x-ray exposure (e.g., per x-ray source activation), and $\Delta t_{readout}$ is the detector readout time per frame.

Using the typical exposure condition of a dental CBCT and the specification of a fixed-anode dental x-ray source (e.g., 0.5-0.7 IEC focal spot size, 15 mA current), the required detector readout times for different imaging configurations were estimated for the targeted CT time and are shown in FIG. 7. For an mSCT imaging device using ten (10) x-ray sources, the required detector speed is within the capability of currently known flat panel detector (FPD) technology. Furthermore, the detector readout time is substantially reduced by limiting the readout to only the band (e.g., region) of detector pixels receiving the primary radiation from the activated x-ray source; thus, only the band, or portion, of the x-ray detector that is aligned with (e.g., specified to be within) the x-ray beam of the presently activated x-ray source transmits data corresponding to the x-ray radiation received, rather than for all of the detector pixels. For example, the commercially available X-Panel 1511 (Detection Technology) is capable of 94 fps in full resolution and can achieve up to 1000 fps in a band readout mode.

For DECT imaging using an mSCT imaging device, example embodiments of which are disclosed herein, half (e.g., 50%) of the x-ray sources are activated using high energy and the other half (e.g., the remaining 50%) of the x-ray sources are activated using lower energy, such that a CT scan is generated for each of the low energy and high energy activation instances. The total radiation skin dose from the two activation energies is the same as the total radiation skin dose received during a single conventional CBCT scan. One disadvantage associated with the use of additional filtration (e.g., as shown in FIG. 6) is a reduction of the photon intensity. In order to achieve the same total radiation skin dose, it has been determined that the total mAs must be increased threefold (3×) at the intended filtration level. For the example configuration of the mSCT imaging device 700 shown in FIG. 6, which includes three (3) LE x-ray sources 712L and three (3) HE x-ray sources 712H sources, a 20 second scan duration can be achieved with 300 views/source. To increase the quantity of the x-ray sources while maintaining the same total radiation skin dose, the scan time must be increased and the quantity of views, or angles about the object being imaged from which projection images are obtained, must be reduced; such modifications can be accommodated using advanced iterative reconstruction algorithm.

In another example embodiment of the mSCT imaging device, volumetric reconstruction is performed using a model-based IR algorithm using two different approaches, or methodologies or techniques. The first approach is to treat the projection data from each individual x-ray source as an independent small cone angle CT, reconstruct the projection data independently (e.g., of other x-ray sources) to form a segment of the image of the object, then combine all of the segments to form the volumetric dataset of the entire object. Among the advantages provided by use of this method is an increase in computational efficiency, as all segment images can be processed in parallel. Among the disadvantages provided by use of this method, however, is that some projection data is wasted (e.g., discarded due to duplication), and the regularization across different segment images requires separate processing. The second approach is to utilize the projection data from all sources as if it comprised a single data set and to create a system matrix for the entire object. This method produces a higher image quality and all projection data is utilized (e.g., none is wasted or discarded), but this method also typically requires large memory allocation and/or utilization and heavy computational requirements.

The mSCT imaging devices/systems disclosed herein can overcome many of the limitations inherent in conventional CBCT imaging. For example, such mSCT imaging devices/systems reduce the scatter radiation and cone-beam imaging artifacts associated with conventional CBCT imaging by decreasing the cone beam angle to about that of a medical fan-beam CT imaging device, but without sacrificing volumetric imaging capability. This approach has been demonstrated to reduce imaging noise (e.g., background signal or that from an interfering source) and increase the contrast-to-noise ratio (CNR) and also to improve soft tissue visualization, enabling mSCT to be used for diagnosis of soft tissue pathology. Such mSCT imaging devices/systems also minimize imaging artifacts induced by the presence of metallic structures on, in, or around the object being imaged by enabling dual energy CT (DECT) and performing virtual monochromatic imaging (VMI) at low cost. VMI reduces metal-induced imaging artifacts, which improves diagnostic accuracy of the resultant images, especially in areas surrounding, for example, dental restorations with high atomic mass (Z) materials, such as fillings and implants. Further, 3D imaging is enabled for not only preoperative implant planning but also postoperative evaluation of the quality and osseointegration of implants, an important clinical task that is currently performed by 2D x-ray due to the presence of metal-induced imaging artifacts inherent in using conventional CBCT imaging techniques. The mSCT imaging devices/systems also allow for accurate measurement of the x-ray attenuation coefficient for various materials and enables basis materials decomposition. Accurate measurement of bone mineral density (BMD) provides more reliable assessment of the quality of craniofacial bone structures and can provide an enhanced indication of dental implant stability and survival rate, which results in more accurate clinical decisions, including tasks such as installation of dental implants and, in some instances, evaluation for osteoporosis.

Figure 8A:
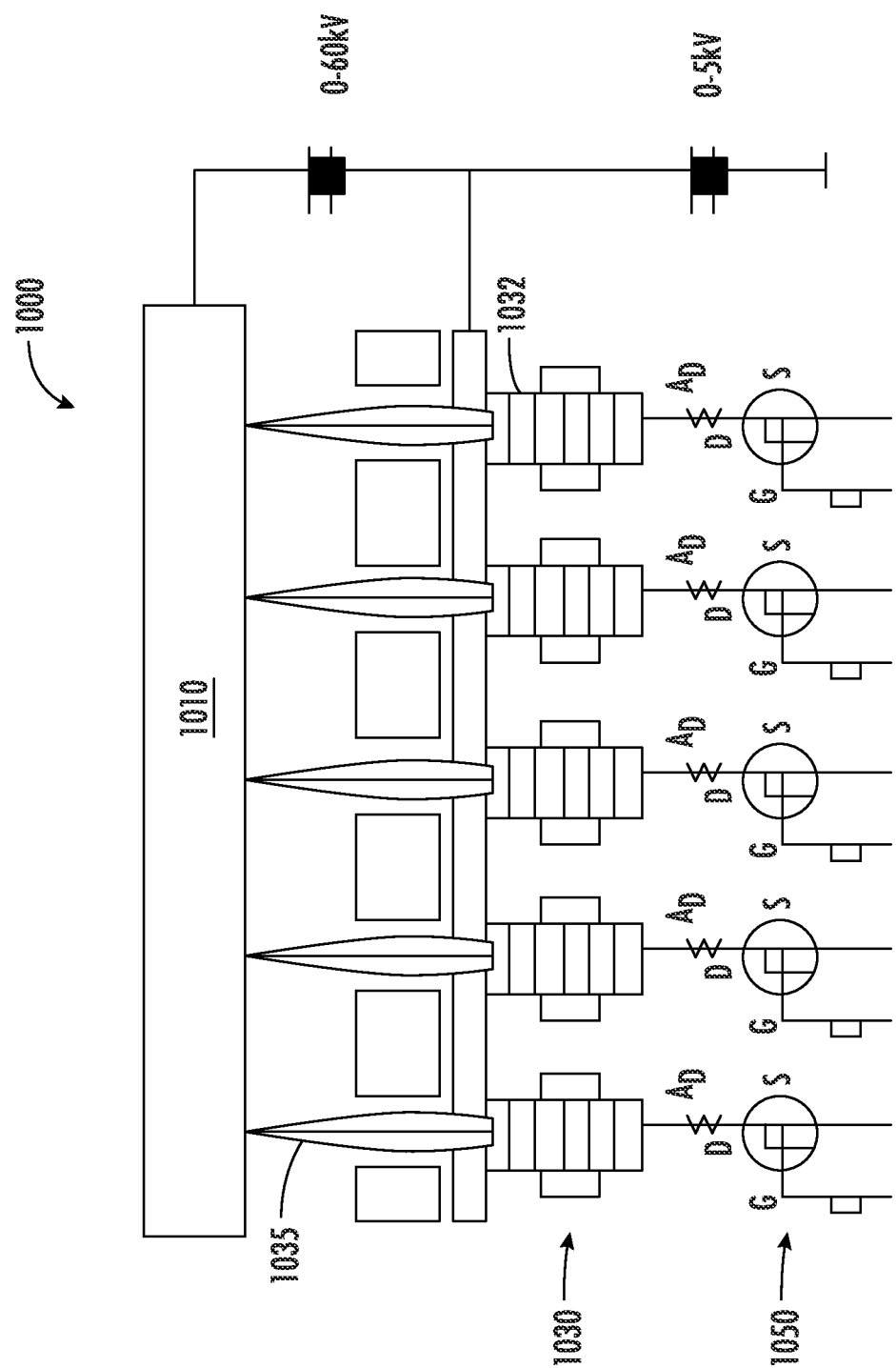
FIG. 8A is a schematic illustration showing the working mechanisms of an example embodiment of a known CNT x-ray source array.
Figure 8B:
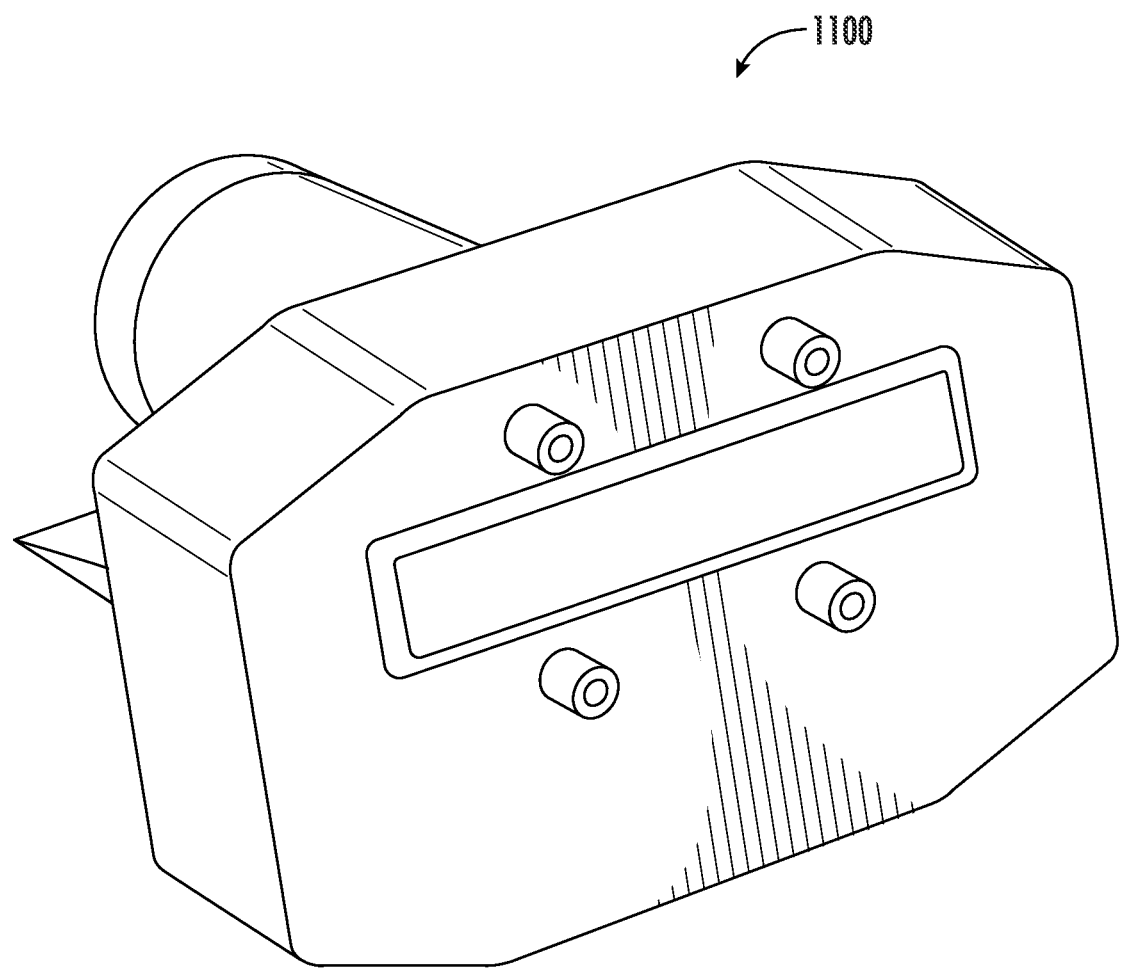
FIG. 8B is an example embodiment of a known dental CNT x-ray source array comprising multiple x-ray sources arranged in a linear array inside a housing.

FIG. 8A illustrates the working mechanisms of a CNT x-ray source array, generally designated 1000, which comprises an anode 1010, a cathode assembly 1030 comprises a plurality of cathodes 1032. Each of the cathodes is in electrical communication with a control circuit 1050, sometimes referred to as a controller. Each control circuit 1050 controls activation of the corresponding cathode 1032 to which the control circuit 1050 is attached. When activated, the cathode 1032 emits an electron beam 1035 towards and incident upon the anode 1010. FIG. 8B illustrates an example dental CNT x-ray source array, generally designated 1100, comprising or consisting of multiple x-ray sources arranged in a linear x-ray source array inside the evaluated housing that weighs less than 2.5 kg. The x-ray source can be, for example, a CNT x-ray source such as is manufactured commercially by NuRay Technology.

Figure 8C:
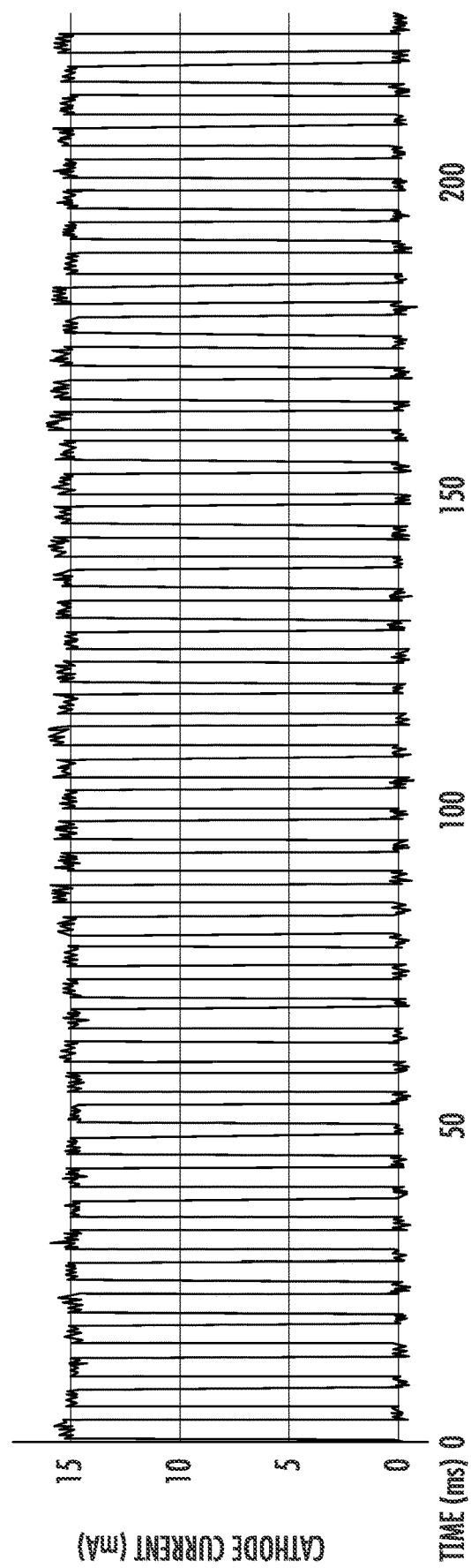
FIG. 8C is a graphical plot of time v. cathode current in an example embodiment of a linear CNT x-ray source array.

FIG. 8C is a graphical plot of cathode current v. time for a linear CNT x-ray source array with 45 focal spots operating at 120 kVp and 15 mA per focal spot. The output power and consistency meet the requirement for mSCT imaging.

Referring to FIGS. 9-16C, various aspects of a dual energy cone-based computed tomography (DE-CBCT) imaging device are disclosed, the DE-CBCT imaging devices using a single carbon nanotube (CNT) x-ray source with dual focal spots and by synthesizing virtual monoenergetic images (VMIs) to reduce the appearance and impact of metal-induced imaging artifacts.

A clinically-used conventional CBCT imaging system is suitable for dental imaging and comprises an x-ray source and an x-ray detector, which are positioned on substantially opposite sides of an object, such as a human skull, such that the x-ray source generates an x-ray beam that passes through the object and is incident on the x-ray detector. The x-ray detector can be a flat=panel x-ray detector.

A dual-energy CBCT (DE-CBCT) imaging system, or a multiple-energy CBCT (ME-CBCT) imaging system, is disclosed herein. Such DE-CBCT imaging systems have an x-ray source containing two or more independently controllable and operable x-ray focal spots (e.g., on one or more anodes) and an x-ray detector. According to an example embodiment of such a system, the x-ray source and the x-ray detector are mounted on a rotating gantry, or other suitable rotatable support structure, that rotates around the object being imaged to collect the projection images for CT reconstruction. Radiation from the multiple x-ray focal spots on the anode in the x-ray source are individually filtered by one of a plurality of different spectral filters to optimize the energy separation between the x-ray radiation generated from different focal spots and to minimize the spectral overlap therebetween. It is further advantageous, in some example embodiments, to apply voltage dividers, such as power resistors, to the x-ray source to change the effective voltages (e.g., to apply a voltage bias, or offset) between the cathode and the anode, such that the radiation produced from one or more (e.g., each) focal spot has a different energy spectrum for the same applied x-ray tube voltage, before spectral filtration of such radiation by the spectral filters.

Figure 9:
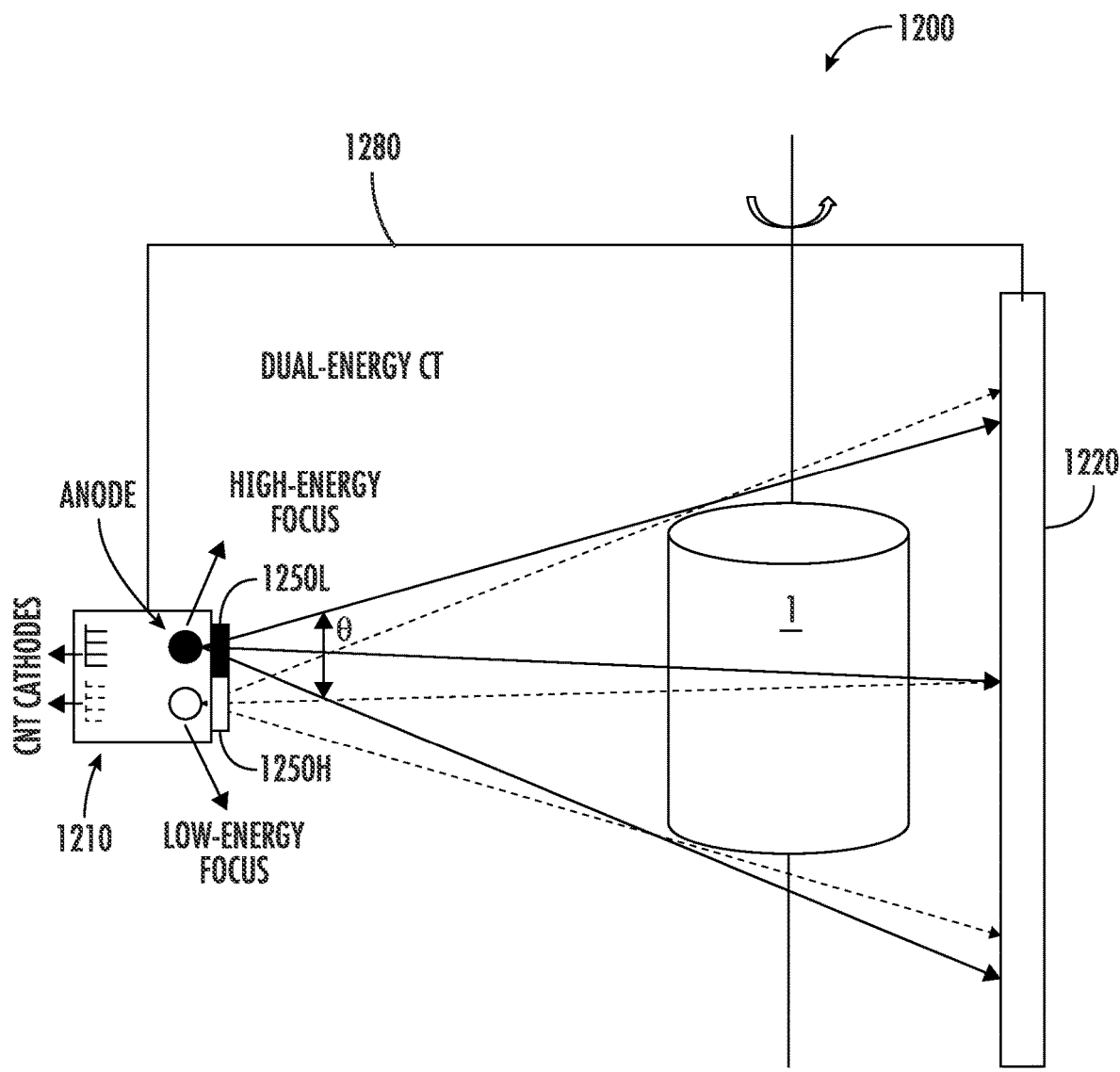
FIG. 9 schematically shows an example embodiment of a dual energy CBCT system using an x-ray source with two cathodes, two focal spots, and two spectral filters, according to the disclosure herein.

FIG. 9 schematically illustrates an example embodiment of a DE-CBCT imaging system, generally designated 1200. The DE-CBCT imaging system 1200 comprises a CNT x-ray source, generally designated 1210, which has two focal spots, and a flat-panel x-ray detector 1220. In determining feasibility for operating this DE-CBCT system 1200, the x-ray source 1210 and the x-ray detector 1220 were held stationary and the object 1 (e.g., a human skull analogue) was rotated. In order to have a baseline for comparison, the conventional CBCT imaging system (Carestream CS9300) was also used to produce CT images of the same object 1. The human skull analogue used was a Rando adult skull and tissue-equivalent head phantom, with 0.25" and 0.125" diameter stainless steel metal beads embedded therein.

Thus, the example embodiment of the DE-CBCT system 1200 comprises a CNT x-ray source 1210, an x-ray detector 1220, and a rotatable support structure for the object 1. During imaging of the object 1, two distinct x-ray spectra with low and high mean energies were generated by applying spectral filters at the constant x-ray tube voltage. The spectral filters comprise a low-energy (LE) filter 1250L, which comprises a material that preferentially attenuates high-energy photons to produce a low mean energy (LE) x-ray spectrum, and a high-energy (HE) filter 1250H, which comprises a material that preferentially attenuates low-energy photons to produce a high mean energy (HE) x-ray spectrum. X-ray energy spectrum were simulated to select the appropriate material(s) for use in the respective spectral filters and to investigate the effect of spectral filtration on the x-ray tube output power required. During the feasibility study, the object 1 was rotated in a step-and-shoot mode at the two different x-ray energy spectra. The two sets of projection images produced by the DE-CBCT imaging system 1200 at the different x-ray energy spectra were reconstructed separately using an iterative volumetric CT reconstruction algorithm. Bilateral filtering in the form of a similarity matrix was applied to both reconstructed images for three (3) iterations, with the window size successively updated from 3*3, 7*7, to 11*11. The Gaussian width was chosen to be 75. The VMIs were synthesized using an image-domain basis materials decomposition method at different energies from the noise suppressed reconstructed images and were compared to the reconstructed images generated using a single energy conventional dental CBCT imaging system. The ability of the CNT x-ray source 1210 of the DE-CBCT imaging system 1200 to generate the output needed to compensate for the reduction of photon flux due to attenuation from the spectral filters 1250L, 1250H and to maintain the CT imaging time was evaluated. Photon flux was evaluated by comparing the post-object air kerma rate between the conventional CBCT imaging system with the DE-CBCT system 1200 of FIG. 9 with x-ray spectrum simulation software.

Two distinct x-ray spectra with pre-object mean energies of 66.7 keV and 86.3 keV were produced at a constant 120 kVp x-ray tube voltage using Al+Au and Al+Sn as the respective material for the LE filter 1250L and material for the HE filter 1250H. The VMIs of the object 1 that were synthesized using the reconstructed DE-CBCT image datasets (e.g., those generated by the DE-CBCT system 1200 of FIG. 9) displayed fewer metal-induced imaging artifacts compared to the single energy spectrum CBCT images produced using the conventional CBCT imaging system, as well as when the DE-CBCT imaging system 1200 of FIG. 9 was utilized with only a single energy level (i.e., not utilizing multiple activation energies).

The DE-CBCT imaging system 1200 comprises an x-ray source 1210 and a flat panel x-ray detector 1220. Both the x-ray source 1210 and the x-ray detector 1220 are connected to a rotating gantry 1280, which is positioned about the object 1 being imaged, such that the rotating gantry 1280, as well as the x-ray source 1210 and the x-ray detector 1220, are rotatable around an axis of rotation, which is advantageously substantially coaxial with a central axis of the object 1. The x-ray source 1210 contains two electron emitting cathodes and two corresponding focal spots on the anode. The x-ray source 1210 generates two conically-shaped x-ray beams, one from each of the two focal spots on the anode of the x-ray source 1210. The radiation emitted by the x-ray source 1210 is filtered by a low-energy (LE) spectral filter 1250L and a high-energy (HE) spectral filter 1250H, respectively. The spectral filters 1250L, 1250H are attached to the x-ray source 1210. The LE spectral filter 1250L comprises a material, or materials, that preferentially attenuates x-ray photons with comparatively high photon energies, such that an LE x-ray beam (shown in solid line in FIG. 9), which has photons with a low mean energy, is produced. The HE spectral filter comprises a material, or materials. that preferentially attenuates x-ray photons with comparatively low photon energies, such that an HE x-ray beam (shown in broken line in FIG. 9), which has photons with a high mean energy, is produced. As used herein, "comparatively" means in comparison to the mean energy of the photons in the other conically-shaped x-ray beam.

In some embodiments, the x-ray exposure (e.g., as controlled by the activation of a respective one of the cathodes of the x-ray source 1210) of the object 1 alternates between the LE and HE x-ray beams, such that LE and HE projection images, respectively, of the object 1 are produced during the CT scanning process. The respective projection images that are generated by one of the LE or HE x-ray beams are recorded on a common flat panel x-ray detector 1220, such that both the LE and HE projection images are captured by a common, or shared (e.g., single), x-ray detector 1220. Therefore, as the gantry 1280 rotates the x-ray source 1210 ang the x-ray detector 1220 around the object 1, two complete sets of projection images are collected, a first set of "LE" projection images and a second set of "HE" projection images, during a single rotation of the gantry. Thus, it is only necessary to rotate the gantry a single time (e.g., by about 180° or about 360°) in order for the first set of LE projection images and the second set of HE projection images to be generated by the DE-CBCT imaging system 1200. These LE and HE projection image sets are then reconstructed into 3D volumes. In some example embodiments, the x-ray source 1210 contains two cathodes, each cathode producing an electron beam that is directed towards and is incident upon (e.g., "bombards") the focal spot on the anode that corresponds to that particular cathode.

In some embodiments, the x-ray source 1210 comprises an assembly of two discrete x-ray tubes, each x-ray tube having a cathode and a focal spot on an anode. In some embodiments, the x-ray source 1210 comprises an x-ray tube with two cathodes and two focal spots on one or more anodes. In some embodiments, the x-ray source 1210 is a carbon nanotube (CNT) based x-ray source and has two independently controlled field emission cathodes, with two corresponding focal spots on a common anode. The use of such field emission cathodes in the x-ray source 1210 advantageously provides the ability for rapid switching between generating the respective LE and HE x-ray beams and, furthermore, allows for the x-ray flux and exposure time for each x-ray beam to be independently programmed in the CNT x-ray source 1210, allowing for optimization of the x-ray dose and noise levels in the resultant LE and HE projection images.

According to an example illustrative embodiment of such an x-ray source 1210, a constant and positive tube voltage (Va) in the range of about 60 kilo-voltage (kV) to about 160 kV is applied to the anode during a CT scan and a comparatively low voltage on the order of about 100V to about 3 kV is applied between the cathode and the gate electrodes (Vc). The gate electrodes are programmed to activate the electron emission from each cathode for a pre-determined current and exposure time for each x-ray exposure (e.g., the period of time during which x-rays are emitted continuously).

In some example embodiments, the focal spots from which the LE and HE x-ray beams are generated, respectively, are aligned vertically, substantially parallel to the rotation axis of the gantry 1280 and/or of the object 1 being imaged, as illustrated in FIG. 9. In some embodiments, the focal spots are substantially aligned either along a direction of a rotation axis of the gantry 1280 or along a direction of rotation of the gantry 1280. In another example embodiment, the focal spots from which the LE and HE x-ray beams are generated, respectively, are aligned perpendicular to the rotation axis of the gantry 1280 and/or of the object 1 being imaged and are spaced apart from each other along the rotation direction of the x-ray source 1210 as the gantry 1280 is rotated about the object 1.

In some embodiments, it is advantageous for the LE and HE x-ray beams to have the same x-ray exposure pre-object or post-object. Since the HE spectral filter 1250H often attenuates more x-ray photons than the LE spectral filter 1250L, it is advantageous to set the exposure time for the HE beam to be longer than the exposure time for the LE beam for each HE projection image being generated (e.g., at each position about the object 1 where a projection image is generated), so as to maintain a comparable exposure level between the LE and HE beams. In some embodiments, the electric current for the x-ray tube that generates the HE beam is greater than the electric current for the x-ray tube that generates the LE beam.

In an example embodiment, a constant tube voltage in the range of about 60 kVp to about 120 kVp is applied to the x-ray source 1210. In one particular example. the tube voltage is 120 kVp. A flat panel x-ray detector 1210 (FDP) is used to record the projection images. The low energy (LE) spectral filter 1250L comprises 7 mm thick Aluminum (Al) and 0.05 mm thick Gold (Au), which are used in combination to modify the energy spectrum (e.g., the mean energy) of the x-ray photons generated from the first, or LE, focal spot. The high energy (HE) spectral filter 1250H comprises 11 mm thick Al and 0.63 mm Tin (Sn), which are used in combination to modify the energy spectrum (e.g., the mean energy) of the x-ray photons generated from the second, or HE, focal spot.

Figure 10:
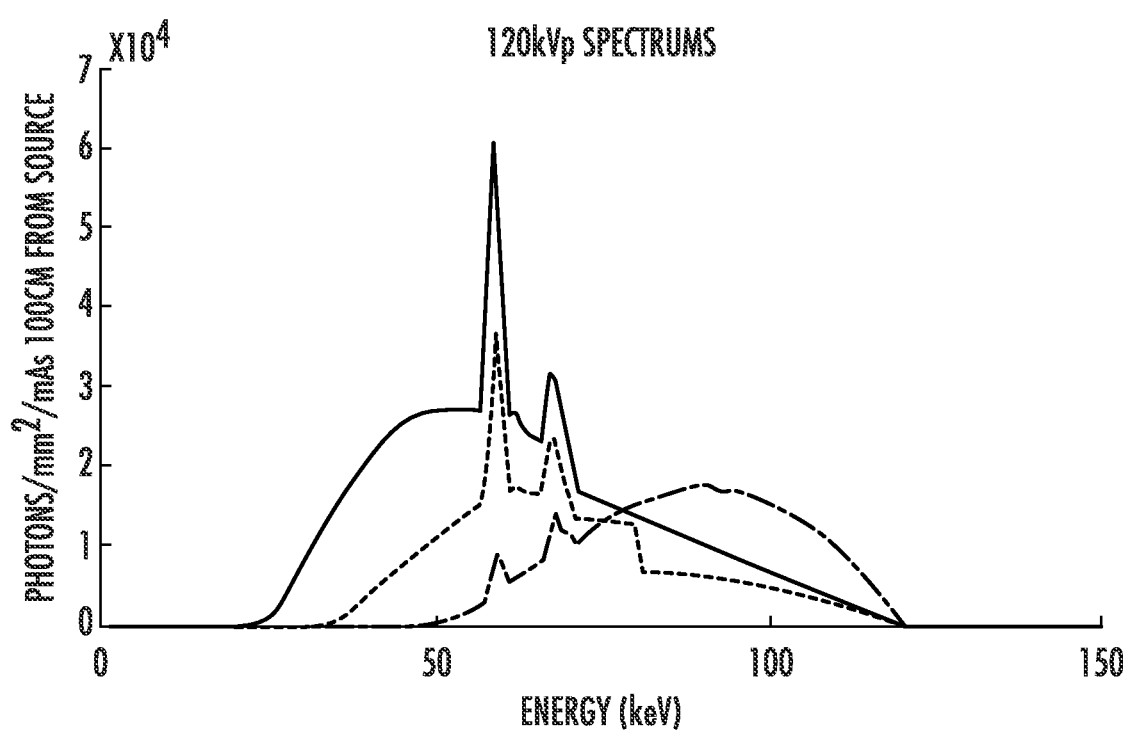
FIG. 10 is a graphical plot of simulated x-ray energy spectra from an x-ray source of an example embodiment of a dual energy CBCT system, prior to and after the x-rays passing through the respective LE and HE spectral filters.

FIG. 10 shows a simulated x-ray spectra. As shown in FIG. 10, two distinct energy spectra with about 20 keV separation in the mean energies are produced after the spectral filtration. For dual energy CT imaging, the x-ray source 1210 and the x-ray detector 1220 rotate in unison around the object 1, which is held in a stationary, or fixed, position. In one example, the x-ray source 1210 and the x-ray detector 1220 rotate around the object 1 by about 360 degrees. During the rotation of the x-ray source 1210 and the x-ray detector 1220 about the object 1, the LE and HE x-ray beams (e.g., radiation emissions) are activated in an alternating pattern, such that the LE x-ray beam is activated for a predetermined exposure time to form an LE projection image of the object 1 on the x-ray detector 1220 and, after such exposure time has elapsed, the LE x-ray beam is turned off (e.g., deactivated, de-energized, etc.); after the LE x-ray beam is turned off, the HE x-ray beam is activated for a predetermined exposure time to form an HE projection image of the object 1 on the x-ray detector 1220 and, after such exposure time has elapsed, the HE x-ray beam is turned off (e.g., deactivated, de-energized, etc.). The process of alternatingly activating and deactivating the LE x-ray beam and the HE x-ray beam is repeated sequentially until the rotation of the gantry 1280 relative to the object 1 being imaged is completed.

In an example embodiment, 360 LE projection images and 360 HE projection images are collected over a full rotation of 360° of the gantry 1280 around the object 1 being imaged, with an LE projection image and an HE projection image being generated for about every 1° of rotation of the gantry 1280 about the object 1. The LE and HE projection images are then processed and reconstructed to generate the dual energy CT dataset.

As noted elsewhere herein, in an initial feasibility study, a rudimentary version of the DE-CBCT imaging system 1200 was created and used to demonstrate the improvements associated therewith over conventional CBCT imaging systems. During this feasibility study, an anthropomorphic head phantom (i.e., as object 1) was first imaged by the conventional CBCT imaging system both before and after a metal bead 10 was attached to the outside surface of the object 1. FIGS. 11A-D show single energy CBCT images (e.g., axial slices of the reconstructed CY image) of the object 1. The image of the object 1 shown in FIG. 11A was generated using a conventional CBCT imaging system, without the external metal bead 10 (see, e.g., FIGS. 11B-D) present. The image of the object 1 shown in FIG. 11B was generated using the conventional CBCT imaging system after the external metal bead, generally designated 10, was attached to the object 1. FIG. 11B clearly shown metal-induced imaging artifacts in the form of dark streaks that are shown as seemingly radiating away from the metal bead 10 in the reconstructed image in FIG. 11B. The image of the object 1 shown in FIG. 11C was generated using the DE-CBCT imaging system 1200 of FIG. 9, using a low activation energy to produce only a low energy (LE) x-ray beam. The image of the object 1 shown in FIG. 11D was generated using the DE-CBCT imaging system 1200 of FIG. 9, using a high activation energy to produce only a high energy (HE) x-ray beam.

Figure 11A:
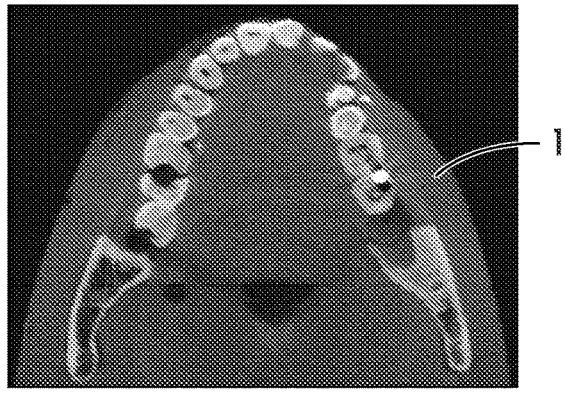
FIGS. 11A and 11B are example reconstructed CBCT images of a human skull analogue, which images were obtained using a single energy CBCT imaging system.
Figure 11B:
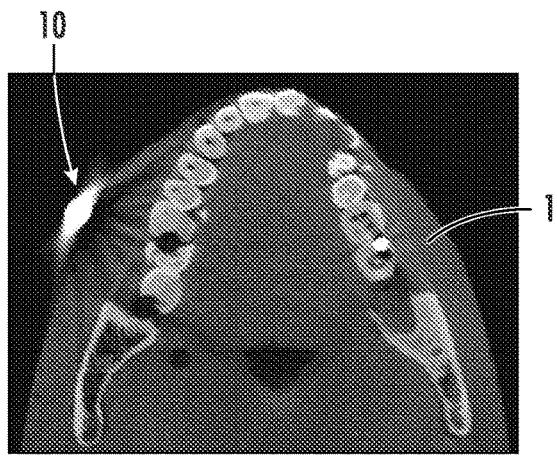
Figure 11C:
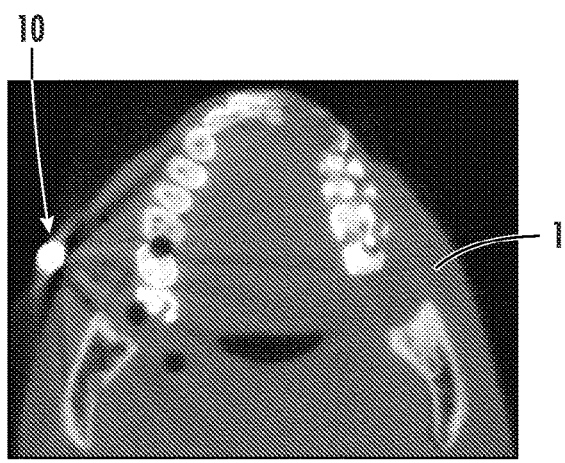
FIGS. 11C and 11D are example reconstructed CBCT images of a human skull analogue, which images were obtained using a dual energy CBCT imaging system.
Figure 11D:
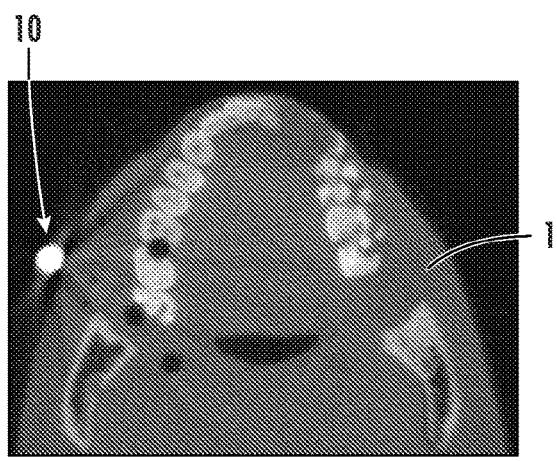

Due to positional limitations, the images shown in FIGS. 11A and 11B, obtained using the conventional CBCT imaging system, and the images shown in FIGS. 11C and 11D, obtained using the DE-CBCT imaging system 1200 of FIG. 9, are not located in exactly the same plane. FIG. 11B clearly shown metal-induced imaging artifacts in the form of dark streaks that are shown as seemingly radiating away from the metal bead in the reconstructed image It can be seen that the use of the DE-CBCT imaging system 1200 of FIG. 9 produces CT images that have fewer imaging artifacts that are caused by the presence of the metal bead 10 within the projection images being produced.

Figure 12A:
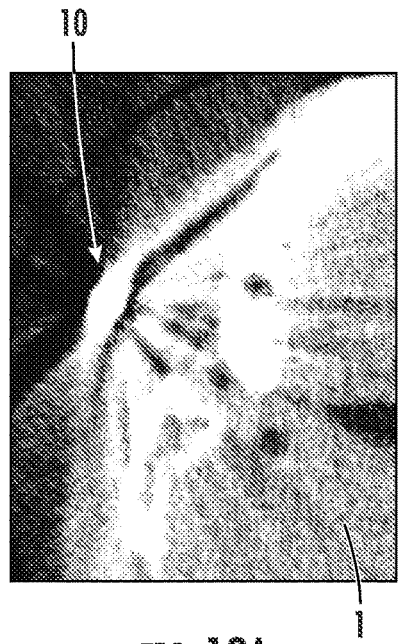
FIGS. 12A-F are enlarged portions of VMIs of a human skull analogue, in which the images are synthesized at different energy levels.
Figure 12B:
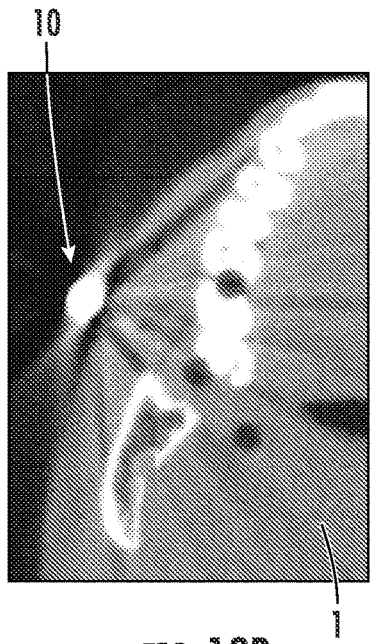
Figure 12C:
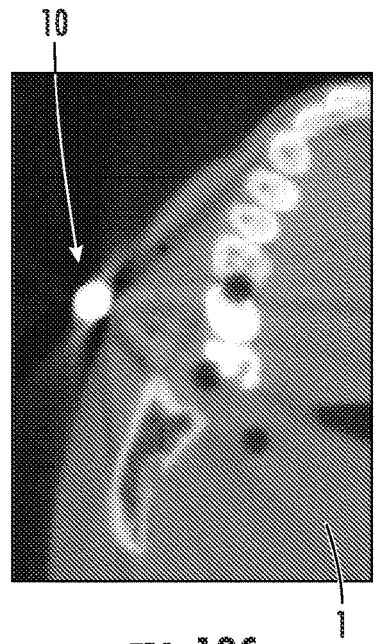
Figure 12D:
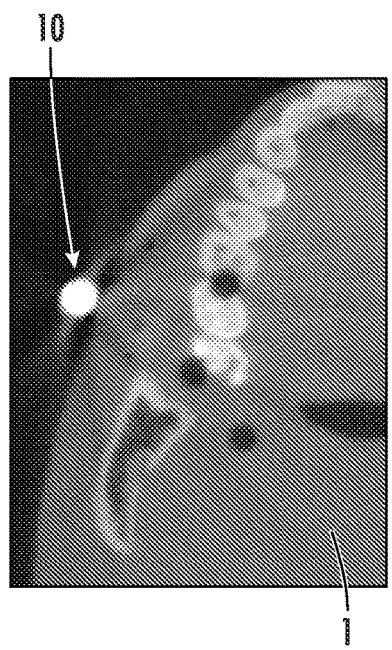
Figure 12E:
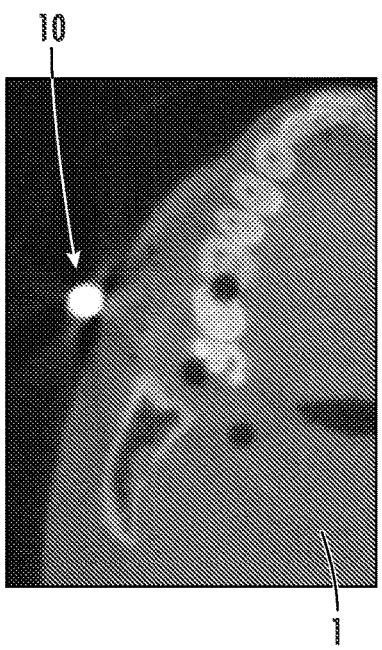
Figure 12F:
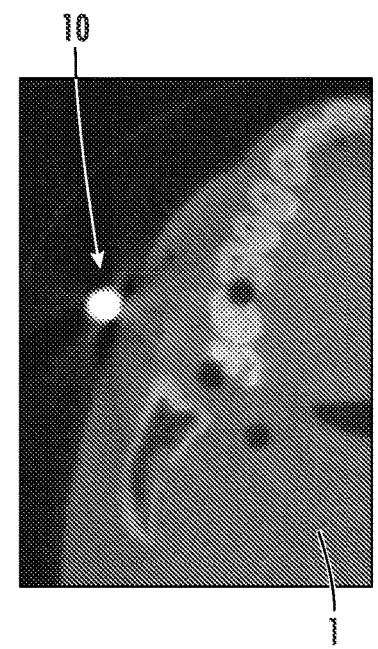

Enlarged VMIs focusing on the region of the object 1, with the metal bead 10 positioned on an external surface thereof, are shown, respectively, in FIGS. 12A-F. The VMIs shown in FIGS. 12A-F are synthesized from the dual-energy dataset, focusing on the region of the object 1 to which the metal bead 10 is attached. In FIG. 12A, the VMI was generated using x-ray spectra energy of 40 keV. In FIG. 12B, the VMI was generated using x-ray spectra energy of 60 keV. In FIG. 12C, the VMI was generated using x-ray spectra energy of 80 keV. In FIG. 12D, the VMI was generated using x-ray spectra energy of 100 keV. In FIG. 12E, the VMI was generated using x-ray spectra energy of 120 keV. In FIG. 12F, the VMI was generated using x-ray spectra energy of 140 keV. Metal-induced imaging artifacts are reduced in the VMIs obtained at 120 keV and 140 keV, as shown in FIGS. 12E and 12F, respectively, compared to the single energy spectrum CBCT images shown in FIGS. 5A and 5B. The noise level of the VMIs generated from the bilateral-filtered reconstructed images were comparable to those of unfiltered reconstructed images, while maintaining the structure, as seen in FIG. 5. Therefore, the CNR was maintained. This reduced the impact of loss in CNR during the image based material decomposition process. The attenuation by the spectral filter increases the x-ray output (mAs) needed to maintain imaging time at the same total imaging dose as one conventional CBCT scan, especially for the HE acquisition. The required x-ray output for the DE-CBCT imaging system 1200 was achieved from a fixed-anode CNT x-ray source array. The calculated CT imaging time for use of the DE-CBCT imaging system 1200 was comparable to conventional CBCT imaging systems.

The virtual monoenergetic images generated using the DE-CBCT datasets were effective in reducing effects induced by the presence of metal, or metal structures, in, on, or around an object 1 being imaged, as shown in FIGS. 12A-F. For the filtration-based dual energy imaging method disclosed herein, whether the x-ray source can deliver the increased photon flux needed to compensate the additional attenuation from the spectral filters to maintain the imaging time was evaluated. As will be shown elsewhere herein, the photon flux after spectral filtration and imaging time for the proposed system is generally comparable to that of conventional CBCT imaging systems.

The effect in which instances of the metal-induced imaging artifacts are reduced is more pronounced at high virtual monoenergetic energies than low energies. The attenuation by a spectral filter 1250L, 1250H increases the x-ray output (mAs) needed to maintain imaging time at the same total imaging dose as one conventional CBCT scan (e.g., as defined by collection of a specified quantity of projection images to generate one or more CT images), especially when the HE filter 1250H is used. The required x-ray output was achieved from a fixed-anode CNT x-ray source array. The CT imaging time for the DE-CBCT imaging system 1200 is comparable to the time required for CT imaging using the conventional CBCT imaging system 103.

Figure 14:
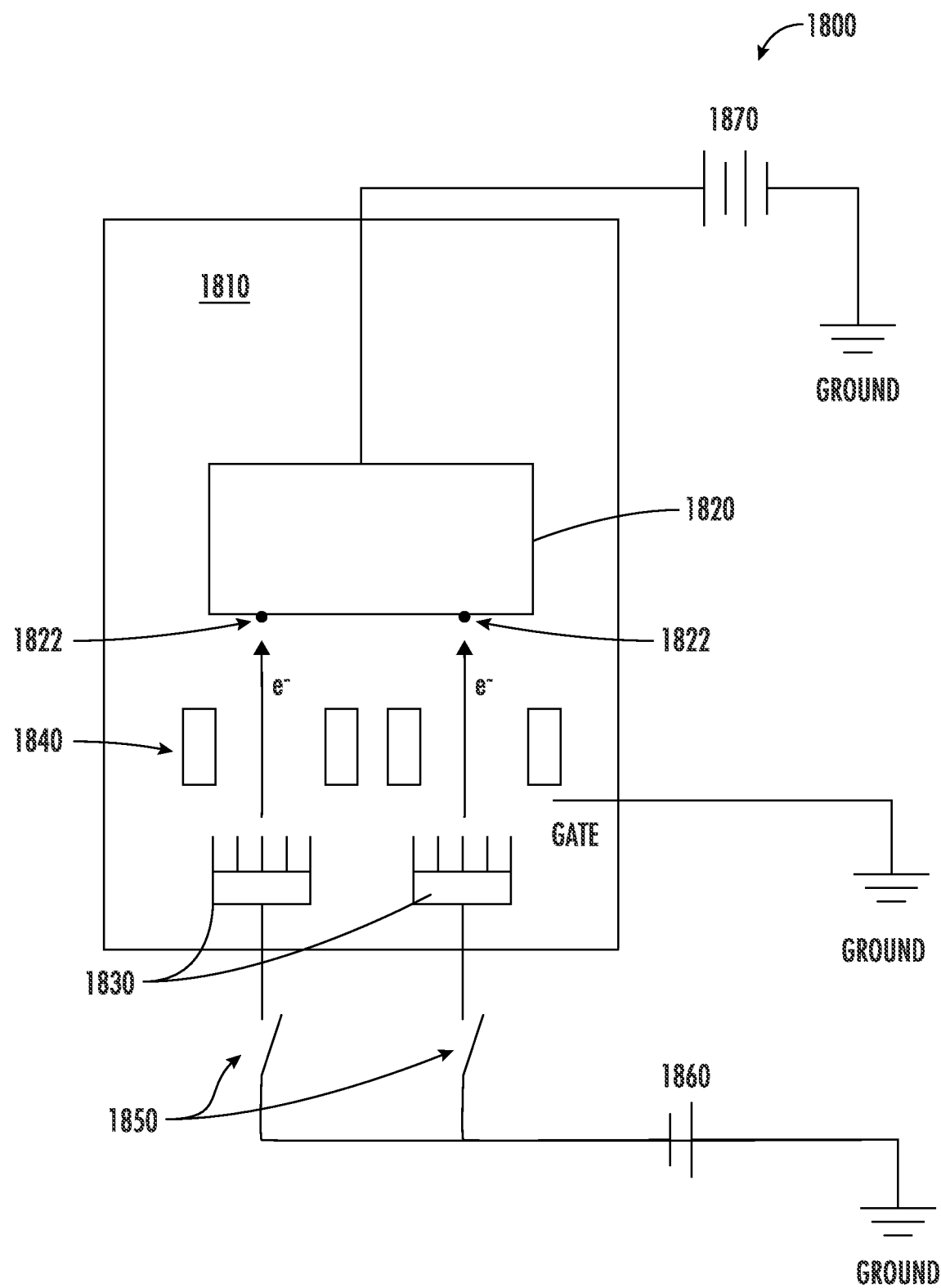
FIG. 14 is an electrical schematic for an example embodiment of a dual energy x-ray source with two cathodes and one anode.

An electrical schematic for an example embodiment of a portion of a DE-CBCT imaging system (e.g., 1200, see FIG. 9), specifically an x-ray source 1810, of such a DE-CBCT imaging system is shown in FIG. 14. According to this example embodiment, the x-ray source 1810 comprises an assembly of two discrete x-ray tubes, each with a cathode 1830 and a focal spot 1822 on a same (e.g., single) anode 1820. Activation of the cathodes 1830 is controlled by a respective switch 1850, the quantity of switches 1850 advantageously being the same as the quantity of the cathodes 1830. Each cathode 1830 is connected, via one of the switches 1850, to a low voltage power supply 1860. The anode 1820 is connected to a high voltage power supply 1870, which supplies a higher electric potential (e.g., voltage) than the low voltage power supply 1860. The cathodes 1830, when activated, emit a stream of electrons $e^-$, which pass through a focusing region, generally designated 1840, that focuses the electrons $e^-$ into an electron beam that strikes the anode 1820 at a corresponding focal spot 1822.

In some embodiments, the x-ray source 1810 comprises an x-ray tube with two cathodes 1830 and two focal spots 1822. In some embodiments, the x-ray source 1810 is a carbon nanotube (CNT) based x-ray source and has two independently controlled field emission cathodes 1830, with two corresponding focal spots 1822 on a common (e.g., shared) anode 1820. The use of such field emission cathodes 1830 in the x-ray source 1830 advantageously provides the ability for rapid switching between the LE and HE x-ray beams and, furthermore, the x-ray flux and exposure time for each LE or HE x-ray beam can be independently programmed in the CNT x-ray source 1810, allowing for optimization of the x-ray dose and noise levels in the LE and HE projection images.

Figure 15:
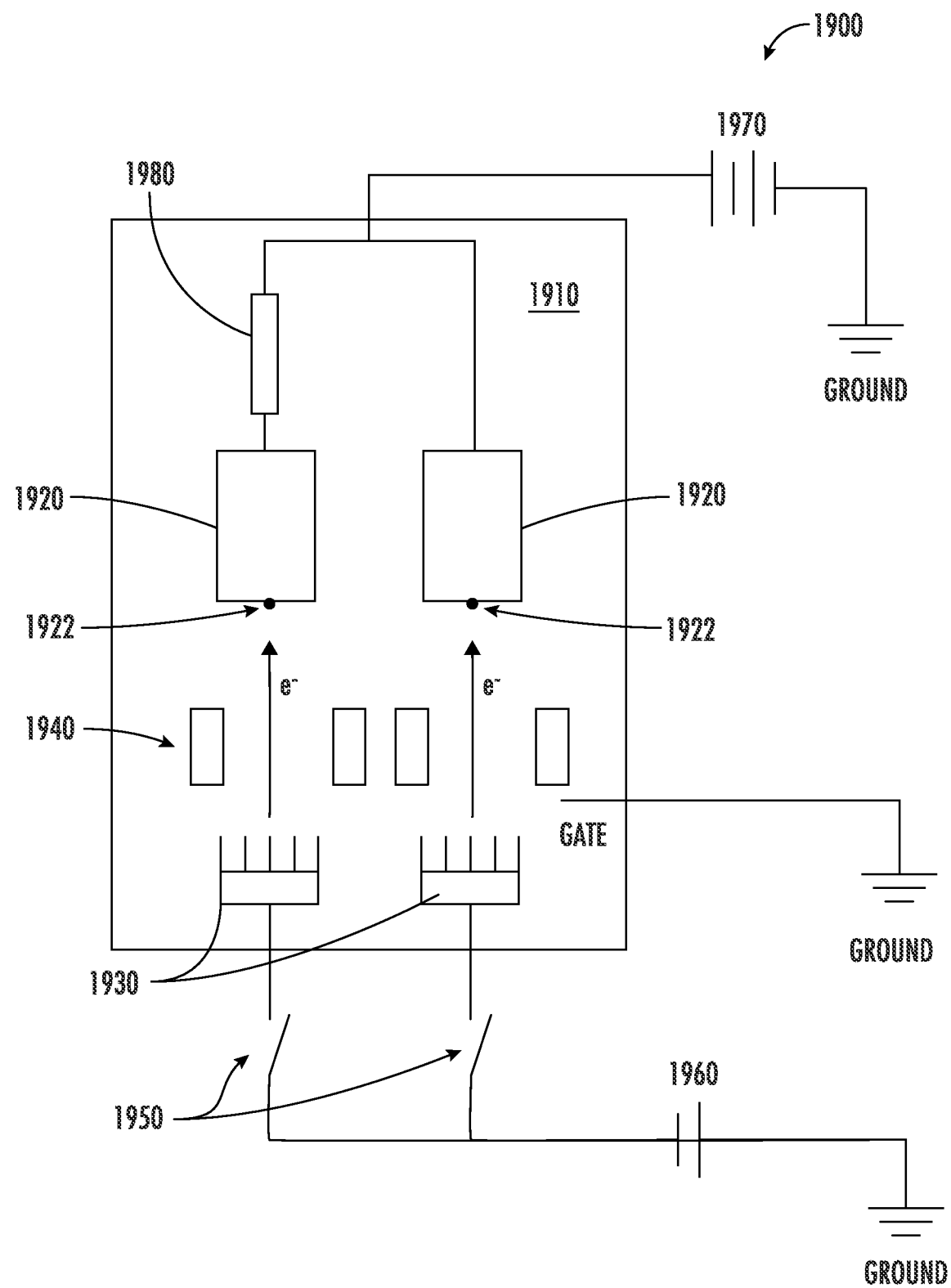
FIG. 15 is an electrical schematic for an example embodiment of a dual energy x-ray source with two cathode-anode pairs and a voltage divider.

An electrical schematic for another example embodiment of a portion of a DE-CBCT imaging system (e.g., 1200, see FIG. 9), specifically an x-ray source 1910, of such a DE-CBCT imaging system is shown in FIG. 15. As shown, the x-ray source 1910 comprises two anodes 1920 that are connected to a common electrical feedthrough (e.g., an electrical connection, or circuit, which can be connected to a high voltage power supply 1970). Activation of the cathodes 1930 is controlled by a respective switch 1950, the quantity of switches 1950 advantageously being the same as the quantity of the cathodes 1930. Each cathode 1930 is connected, via one of the switches 1950, to a low voltage power supply 1960. Each of the anodes 1920 is connected to a high voltage power supply 1970, which supplies a higher electric potential (e.g., voltage) than the low voltage power supply 1960. The cathodes 1930, when activated, emit a stream of electrons e⁻, which pass through a focusing region, generally designated 1940, that focuses the electons e⁻ into an electron beam that strikes the anode 1920 at a corresponding focal spot 1922.

For generating x-ray beams (e.g., LE or HE x-ray beams), a common electrical potential (e.g., voltage, or voltage difference) is applied between one of the cathodes 1930 (e.g., by closing one of the switches 1950 to electrically connect the cathode 1930 to the low voltage power supply 1960) and the corresponding anode 1920 with which the cathode 1930 is connected. A LE spectral filter (e.g., 1250L in FIG. 9) is applied to the x-ray radiation emitted from the first anode (left anode 1920 in FIG. 15) and a HE spectral filter (e.g., 1250H in FIG. 9) is applied to the x-ray radiation emitted from the second anode (right anode 1920 in FIG. 15). To further increase the difference in the average energies of photons in the two (e.g., LE and HE) x-ray beams generated from the electron beam striking one of the two focal spots 1922 on the anode 1920, a voltage divider 1980 is electrically connected in series between the to the first anode 1920 of the x-ray source 1910 and the high voltage power supply 1970. In an example embodiment, the voltage divider 1980 comprises an electrical resistor, which has a resistance value of R. A constant electrical potential V is applied between the electrical feedthrough and the electrical ground. An extraction voltage is applied, via the low voltage power supply 1960, between the gate electrode and the cathode 1930 and an electrical current (e.g., electron beam) is received by the first anode 1920. In this example, the voltage drop across the voltage divider 1980 is expressed by the equation V=I*R, where I is defined as the electrical current provided to the X-ray tube and R is defined as electrical resistance. Thus, the electrical potential between the first anode 1920 and the corresponding cathode 1930 is calculated using the equation ΔV=V−I*R, where V is the electrical potential between the second anode 1920 and the corresponding cathode 1930 is V, which is the voltage supplied by the high voltage power supply 1970 to the second anode 1920.

In the example embodiment shown, the x-ray source 1910 has two anodes 1920 and two cathodes 1930. Both of the anodes 1920 comprise Tungsten metal. Both cathodes 1930 are CNT-based field emission cathodes. Either a common or two separate gate electrodes are used to extract the field emission electrons from the cathode 1930 by applying a bias voltage between the gate and the cathode 1930. In this example, a constant high voltage of about 90-120 kVp is applied to the electrical feedthrough connecting the anodes 1920 to the high voltage power supply 1970. In one example, the voltage applied by the high voltage power supply 1970 is about 100 kVp and the voltage divider 1980 is comprises a resistor having a resistance value of about 2×10⁶ Ohms. For imaging, a bias voltage is applied between the gate electrode and the cathode 1930 such that a 10 mA field emission current, in the form of an electron stream, is transmitted to the corresponding anode 1920. When the x-ray radiation from the first anode 1920 is activated by the 10 mA current, the voltage drop across the resistor of the voltage divider 1980 is about 20 kV. The voltage of the first anode 1920 is thereby reduced to about 80 kV and the voltage of the second anode is about 100 kV. The x-ray radiation from the first anode 1920 is then filtered by a low energy (LE) spectral filter (e.g., 1250L in FIG. 9) and the x-ray radiation from the second anode 1920 is filtered by a high energy (HE) spectral filter (e.g., 1250H in FIG. 9). By electrically connecting in series a voltage divider 1980 in the form of a resistor between the first anode 1920 and the high voltage power supply 1970, the energy separation between the mean, or average, energies of the LE and HE x-ray spectra is increased. Such an increase the mean energies energy separation between the mean energies of the LE and HE x-ray spectra is advantageous for dual energy imaging. In essence, the connection of the voltage divider 1980 in the form of a resistor between the first anode 1920 and the high voltage power supply 1970, as shown in FIG. 15, achieves the effect of the fast kVp switching without actually requiring switching of the voltage output from the power supply.

Figure 16A:
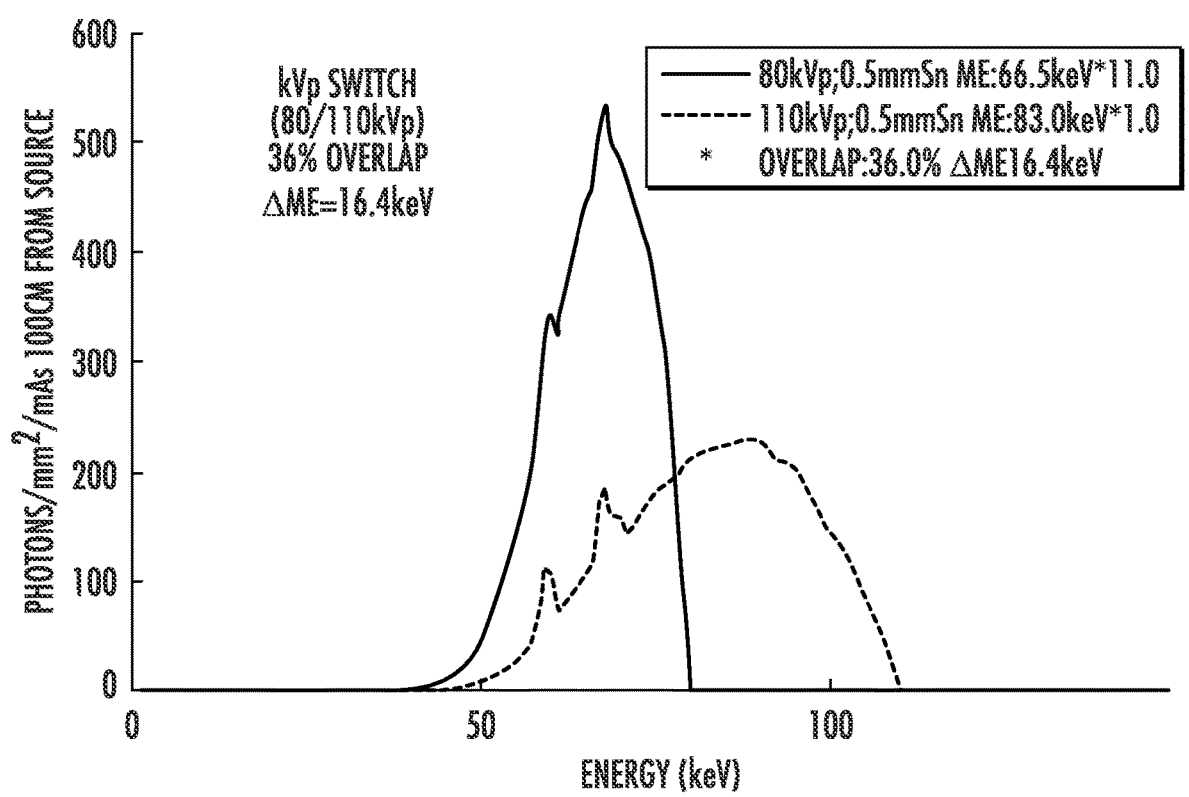
FIGS. 16A-C are graphical plots of simulated x-ray spectra for example embodiments of dual energy CBCT systems, as disclosed herein, after the x-rays have passed through a human skull analogue.
Figure 16B:
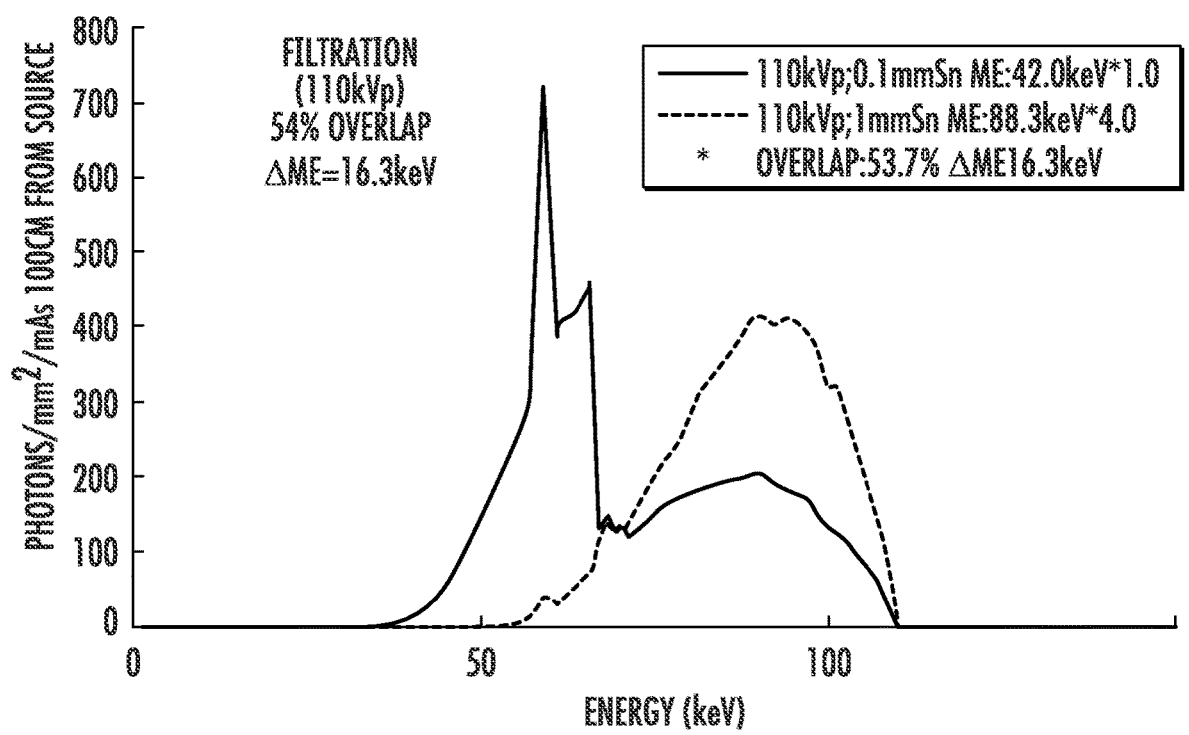
Figure 16C:
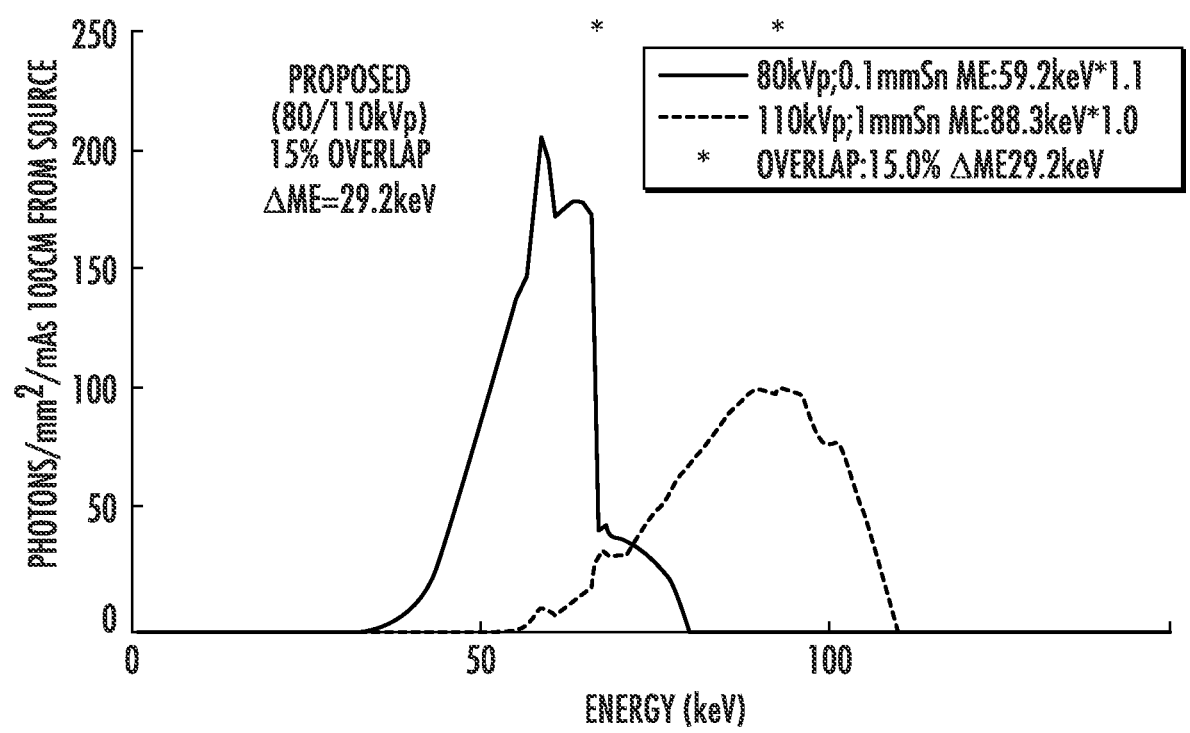

FIGS. 16A-C show the simulated x-ray spectra for the DE-CBCT imaging systems and methods disclosed herein, in comparison to known technologies under otherwise similar conditions intended for DE-CBCT. The simulations were performed for 3 cases. In FIG. 16A, kVp switching is performed at 80 kVp and 110 kVp and a common, or shared, spectral filter was used. In FIG. 16B, spectral filtration is performed using LE and HE filters, but at 110 kVp for each anode 1920 (e.g., with the voltage divider 1980 omitted from the electrical circuit). In FIG. 16C, two different kVp (80/110 kVp) are used to generate LE and HE x-ray beams, respectively, and two different (e.g., LE and HE) spectral filters are used. As shown, the post-object average energy separation of the DE-CBCT systems and methods disclosed herein is about 100% larger (~30 keV) compared to the result in either FIG. 16A or 16B, both of which are about 16 keV. Additionally, the spectral overlap is shown in FIG. 16C is 15%, a reduction of more than 100% as compared to the spectral overlap in FIG. 16A (36%) and FIG. 16B (54%).

The subject matter disclosed herein demonstrates the feasibility of performing filter-based DE-CBCT imaging of an object using an x-ray source with two focal spots operating at the same tube voltage. Metal artifact reduction was achieved in VMIs synthesized at high energy in phantom imaging. Additionally, the x-ray output needed for such imaging tasks is shown herein to be capable of being generated using a fixed-anode CNT x-ray source.

The present subject matter can be embodied in other forms without departure from the spirit and essential characteristics thereof. The embodiments described therefore are to be considered in all respects as illustrative and not restrictive. Although the present subject matter has been described in terms of certain specific embodiments, other embodiments that are apparent to those of ordinary skill in the art are also within the scope of the present subject matter.

The invention claimed is:

1. A volumetric spectral computed tomography (CT) imaging device comprising:
   an x-ray source array comprising M numbers of spatially distributed x-ray focal spots;
   an x-ray beam collimator attached to the x-ray source array, wherein the x-ray beam collimator contains an array of apertures, each configured to confine the x-ray radiation from a corresponding x-ray focal spot to illuminate a corresponding segment of an object to be imaged;
   a digital area x-ray detector configured to detect x-ray radiation and form an x-ray image of the object being imaged, wherein the digital area x-ray detector is positioned on an opposite side of the object with respect to the x-ray source array;
   a gantry configured to rotate the x-ray source array and the digital area x-ray detector around the object, wherein the spatially distributed x-ray focal spots are substantially aligned either along a direction of a rotation axis of the gantry or along a direction of rotation of the gantry;
   an electronic controller that activates the M numbers of x-ray focal spots to scan the object N times as the gantry rotates around the object; and
   one or more processors configured to process the raw N x M projection images to reconstruct a volumetric CT image of the object.

2. The imaging device of claim 1, wherein radiation from each focal spot is configured to be filtered by a corresponding spectral filter.

3. The imaging device of claim 1, wherein only a subset of the focal spots is used to acquire projection images for CT image reconstruction.

4. The imaging device of claim 1, wherein the x-ray focal spots are divided into a first set and a second set;
   wherein x-ray beams from the focal spots in the first set are filtered by a first filter material(s) configured to yield a spectrum with a first mean x-ray photon energy, and x-ray beams in the second set are filtered by a second filter material(s) configured to yield a spectrum with a second mean x-ray photon energy, the first mean x-ray photon energy being different from the second mean x-ray photon energy; and
   wherein two sets of projection images acquired from the first set and the second set are sufficient to reconstruct the volumetric CT image of the whole object at each distinct x-ray spectrum.

5. The imaging device of claim 4, wherein the first mean x-ray photon energy is lower than the second mean x-ray photon energy; and
   wherein the two sets of projection images captured using the first mean x-ray photon energy and the second mean x-ray photon energy are processed to obtain dual energy CT images of the object.

6. The imaging device of claim 4, wherein the two sets of projection images are processed to obtain virtual monochromatic energy CT images of the object at any desired virtual monochromatic energy.

7. The imaging device of claim 1, wherein the x-ray focal spots are divided into multiple sets wherein x-ray beams from the x-ray focal spots in each set are filtered by a unique spectral filter to yield a unique x-ray energy spectrum;
   wherein the x-ray beams from each set illuminate substantially an entire field of view (FOV) to generate one complete set of projection images for CT reconstruction in one gantry rotation; and
   wherein multiple sets of projection images at multiple energies are used for multi-energy CT image reconstruction.

8. The imaging device of claim 1, wherein x-ray beams from the x-ray focal spots are configured to be activated sequentially;
   wherein, for each x-ray exposure, a projection image of a corresponding segment of the object is formed on a corresponding segment of the digital area x-ray detector; and
   wherein the digital area x-ray detector is configured to reject any x-ray photons that are recorded outside the corresponding segment of the digital area x-ray detector as scatter radiation.

9. The imaging device of claim 1, wherein the x-ray source array with x-ray focal spots is housed in one common and evacuated housing with either one elongated anode or multiple anodes.

10. The imaging device of claim 1, wherein the x-ray source array is a carbon nanotube-based field emission x-ray source array.

11. The imaging device of claim 1, wherein an x-ray beam from each focal spot is configured to cover the object entirely; and
    wherein the N×M projection images of the object is configured to be used for tomographic or tomosynthesis image reconstruction of the object equivalent to that from a 2D area array of the focal spots.

12. The imaging device of claim 1, wherein the digital area x-ray detector uses a dynamic region-of-interest (ROI) readout method, to increase a data readout speed of the digital area x-ray detector;
    wherein, after exposure from each collimated x-ray beam, only a "band," or ROI, of the digital area x-ray detector that receives primary transmitted x-ray photons is read by the digital area x-ray detector instead of the entire detector.

13. The imaging device of claim 12, wherein a precise location of each detector band associated with each x-ray focal spot is pre-determined from the configuration of the imaging device, wherein a region of the digital area x-ray detector to be read for each specific x-ray exposure is automatically determined.

14. The imaging device of claim 1, wherein the N×M projection images are treated as one complete data set for volumetric CT reconstruction using a model-based iterative reconstruction method, wherein locations of the x-ray focal spots for the N×M projection images are predetermined during system calibration.

15. The imaging device of claim 1, wherein the reconstructed CT images are stored in a Digital Imaging and Communications in Medicine (DICOM) format and can be viewed, analyzed and stored.

16. A method for performing volumetric spectral computed tomography (CT) imaging of an object, the method comprising:
    providing a volumetric spectral computed tomography imaging device comprising:
       an x-ray source array comprising M numbers of spatially distributed x-ray focal spots;
       an x-ray beam confiner attached to the x-ray source array, wherein the x-ray beam confiner contains an array of apertures, each configured to confine the x-ray radiation from a corresponding x-ray focal spot to a fan beam having a narrow cone angle that illuminates a corresponding segment of the object to be imaged;

a digital area x-ray detector configured to detect x-ray radiation and form an x-ray image of the object being imaged, wherein the digital area x-ray detector is positioned on an opposite side of the object with respect to the x-ray source array; and a gantry configured to rotate the x-ray source array and the digital area x-ray detector around the object, wherein the spatially distributed x-ray focal spots are substantially aligned along a direction of a rotation axis of the gantry;

activating the M numbers of x-ray focal spots to scan the object N times;

rotating the gantry around the object while the x-ray focal spots are activated;

filtering radiation from each focal spot by a corresponding spectral filter; and processing, using one or more processors, N×M projection images to reconstruct a volumetric CT image of the object.

17. The method of claim 16, further comprising using only a subset of the focal spots to acquire projection images for CT image reconstruction.

18. The method of claim 16, wherein the x-ray focal spots are divided into a first set and a second set;

wherein x-ray beams from the focal spots in the first set are filtered by a first filter material configured to yield a spectrum with a first mean x-ray photon energy, and x-ray beams in the second set are filtered by a second filter material configured to yield a spectrum with a second mean x-ray photon energy, the first mean x-ray photon energy being different from the second mean x-ray photon energy; and wherein two sets of projection images acquired from the first set and the second set are sufficient to reconstruct the volumetric CT image of the whole object at each distinct x-ray spectrum.

19. The method of claim 18, wherein processing the N×M images comprises processing images captured using the first mean x-ray photon energy and images captured using the second mean x-ray photon energy to obtain a single volumetric CT image of the object.

20. The method of claim 18, wherein the first mean x-ray photon energy is lower than the second mean x-ray photon energy; and wherein the two sets of projection images captured using the first mean x-ray photon energy and the second mean x-ray photon energy are processed to obtain dual energy CT images of the object.

21. The method of claim 18, wherein the two sets of projection images are processed to obtain one or more virtual monochromatic energy CT images of the object at any desired energy.

22. The method of claim 16, wherein the x-ray focal spots are divided into multiple sets wherein x-ray beams from the x-ray focal spots in each set are filtered by a unique spectral filter to yield a unique x-ray energy spectrum; and wherein the x-ray beams from each set illuminate substantially an entire field of view (FOV) to generate one complete set of projection images for CT reconstruction in one gantry rotation.

23. The method of claim 16, further comprising sequentially activating x-ray beams from the x-ray focal spots;

wherein, for each x-ray exposure, a projection image of a corresponding segment of the object is formed on a corresponding segment of the digital area x-ray detector; and wherein the digital area x-ray detector is configured to reject any x-ray photons recorded outside the corresponding segment of the digital area x-ray detector as scatter radiation.

24. The method of claim 16, wherein the x-ray source array with x-ray focal spots is housed in one common and evacuated housing with either one elongated anode or multiple anodes.

25. The method of claim 16, wherein the x-ray source array is a carbon nanotube-based field emission x-ray source array.

26. The method of claim 16, wherein an x-ray beam from each focal spot is configured to cover the object entirely; and wherein the N×M projection images of the object is configured to be used for tomographic or tomosynthesis image reconstruction of the object equivalent to that from a 2D area array of the focal spots.

27. A volumetric computed tomography (CT) scanner comprising:

an x-ray source array comprising M numbers of spatially distributed x-ray focal spots enclosed in a same evacuated housing, wherein the spatially distributed x-ray focal spots are aligned along an axis of rotation of the scanner;

an x-ray beam collimator comprising an array of apertures, wherein each aperture of the array of apertures is aligned with, and configured to confine x-ray radiation from, a corresponding one of the spatially distributed x-ray focal spots of the x-ray source array, such that the x-ray radiation from the corresponding one of the spatially distributed x-ray focal spots form a fan beam shape with a narrow cone angle to illuminate a corresponding segment of an imaged object;

a digital area x-ray detector configured to detect x-ray radiation to form an x-ray image of the imaged object;

a gantry configured to rotate the x-ray source array and the digital area x-ray detector around the object;

an electronic controller configured to activate and regulate exposures of the x-ray radiation from each of the spatially distributed x-ray focal spots to illuminate the imaged object N times from each of the spatially distributed focal spot as the gantry rotates around the imaged object to produce a quantity of N×M raw projection images; and one or more processors configured to process the quantity of N×M raw projection images to reconstruct a volumetric CT image of the imaged object.

28. The scanner of claim 27, wherein, for each projection image of the quantity of N×M raw projection images, the one or more processors are configured to estimate and remove scattered x-ray photons recorded in detector rows of the digital area x-ray detector illuminated by primary x-ray photons of the x-ray radiation emitted from an active focal spot of the spatially distributed x-ray focal spots based on scattered x-ray photons recorded on adjacent detector rows of the digital area x-ray detector that are not illuminated by the primary x-ray photons.

29. The scanner of claim 27, wherein the x-ray source array is a carbon nanotube (CNT) based field emission x-ray source array comprising a metal anode, along which the M numbers of spatially distributed x-ray focal spots are linearly distributed and M numbers of CNT field emission cathodes enclosed in the same evacuated housing.

\* \* \* \* \*